US009656446B2

(12) United States Patent
Subramanian et al.

(10) Patent No.: US 9,656,446 B2
(45) Date of Patent: May 23, 2017

(54) ARTICLES AND METHODS OF MAKING THE SAME

(71) Applicant: Dow Global Technologies LLC, Midland, MI (US)

(72) Inventors: Muthu Subramanian, Singapore (SG); Jinder Jow, New York, NY (US); Stephen Y. Cheng, Sheung Shui (HK); Thiam Aik Lim, Singapore (SG)

(73) Assignee: Dow Global Technologies LLC, Midland, MI (US)

( * ) Notice: Subject to any disclaimer, the term of this patent is extended or adjusted under 35 U.S.C. 154(b) by 459 days.

(21) Appl. No.: 14/181,787

(22) Filed: Feb. 17, 2014

(65) Prior Publication Data

US 2014/0162079 A1    Jun. 12, 2014

Related U.S. Application Data

(62) Division of application No. 12/742,494, filed as application No. PCT/US2008/082989 on Nov. 10, 2008, now Pat. No. 8,652,624.

(60) Provisional application No. 60/987,803, filed on Nov. 14, 2007.

(51) Int. Cl.
| | |
|---|---|
| B32B 25/08 | (2006.01) |
| B32B 27/08 | (2006.01) |
| B32B 27/18 | (2006.01) |
| B32B 27/32 | (2006.01) |
| B32B 27/40 | (2006.01) |
| B32B 27/30 | (2006.01) |

(52) U.S. Cl.
CPC .............. *B32B 27/32* (2013.01); *B32B 25/08* (2013.01); *B32B 27/08* (2013.01); *B32B 27/18* (2013.01); *B32B 27/302* (2013.01); *B32B 27/304* (2013.01); *B32B 27/325* (2013.01); *B32B 27/40* (2013.01); *B32B 2270/00* (2013.01); *B32B 2307/306* (2013.01); *B32B 2307/7242* (2013.01); *B32B 2307/7244* (2013.01); *B32B 2433/00* (2013.01); *B32B 2437/00* (2013.01); *B32B 2437/02* (2013.01); *B32B 2439/40* (2013.01); *B32B 2457/00* (2013.01); *B32B 2457/04* (2013.01); *B32B 2479/00* (2013.01); *B32B 2509/00* (2013.01); *B32B 2581/00* (2013.01); *B32B 2597/00* (2013.01); *B32B 2605/00* (2013.01); *Y10T 428/2495* (2015.01); *Y10T 428/3154* (2015.04); *Y10T 428/3158* (2015.04); *Y10T 428/31554* (2015.04); *Y10T 428/31569* (2015.04); *Y10T 428/31583* (2015.04); *Y10T 428/31587* (2015.04); *Y10T 428/31598* (2015.04); *Y10T 428/31667* (2015.04); *Y10T 428/31826* (2015.04); *Y10T 428/31924* (2015.04)

(58) Field of Classification Search
CPC ......... B32B 25/08; B32B 27/08; B32B 27/18; B32B 27/32; B32B 27/302; B32B 27/304; B32B 27/325; B32B 27/40; B32B 2250/02; B32B 2270/00; B32B 2597/00
See application file for complete search history.

(56) References Cited

U.S. PATENT DOCUMENTS

| | | |
|---|---|---|
| 3,616,189 A | 10/1971 | Harr |
| 3,645,992 A | 2/1972 | Dow |
| 3,821,143 A | 6/1974 | Cluff et al. |
| 4,076,698 A | 2/1978 | Anderson et al. |
| 4,339,507 A | 7/1982 | Kurtz et al. |
| 4,352,849 A | 10/1982 | Mueller |
| 4,734,305 A | 3/1988 | Sugimoto et al. |
| 4,776,909 A | 10/1988 | Bohm et al. |
| 4,868,967 A | 9/1989 | Holt et al. |
| 4,967,818 A | 11/1990 | Gartland et al. |
| 5,026,798 A | 6/1991 | Canich |

(Continued)

FOREIGN PATENT DOCUMENTS

| | | |
|---|---|---|
| CA | 2039292 A1 | 10/1991 |
| EP | 1426181 A1 | 6/2004 |

(Continued)

OTHER PUBLICATIONS

Kinstle et al.; "Thin inorganic barrier coatings: The converters role."; Annual Technical Conference Proceedings—Society of Vacuum Coaters; 1994; 37th 134-8 Publisher: Society of Vacuum Coaters.
Socci et al.; "New high barrier, oxygen scavenging polyamides for packaging applications"; Annual Technical Conference—Society of Plastics Engineers; 2001; 59th vol. 2; 1721-1725; Society of Plastics Engineers.

(Continued)

*Primary Examiner* — Brian P Mruk

(57) ABSTRACT

The invention provides an article comprising a first layer and a second layer, and wherein the first layer is formed from a first composition comprising an ethylene/α-olefin/diene interpolymer, an isoprene rubber (synthetic), a natural rubber, a butadiene rubber, a styrene butadiene rubber, a chloroprene rubber, a nitrile rubber, a hydrogenated nitrile rubber, a chlorinated polyethylene, a chlorosulfonated polyethylene, an ethylene/propylene rubber, an ethylene/diene copolymer, a fluoro rubber, a polyurethane, a silicone rubber, or a combination thereof; and wherein the second layer is formed from a second composition comprising a butyl rubber, a halobutyl rubber, polyvinylidene chloride, a brominated polymer derived from a copolymer of isobutylene and p-methyl styrene, a nitrile rubber, a chloroprene rubber, a chlorosulfonated polyethylene, a chlorinated polyethylene, a polyurethane, a fluoro rubber, or a combination thereof.

18 Claims, No Drawings

(56) References Cited

U.S. PATENT DOCUMENTS

| | | |
|---|---|---|
| 5,042,176 A | 8/1991 | Rudy |
| 5,049,220 A | 9/1991 | Gartland et al. |
| 5,272,236 A | 12/1993 | Lai et al. |
| 5,278,272 A | 1/1994 | Lai et al. |
| 5,285,230 A | 2/1994 | Ceisel |
| 5,376,499 A | 12/1994 | Hammerschmidt et al. |
| 5,703,187 A | 12/1997 | Timmers |
| 5,728,272 A | 3/1998 | Hammon et al. |
| 5,902,854 A | 5/1999 | Kelley et al. |
| 5,941,286 A | 8/1999 | Fauble et al. |
| 5,957,164 A | 9/1999 | Campbell |
| 5,992,486 A | 11/1999 | Katsuki et al. |
| 6,054,544 A | 4/2000 | Finlayson et al. |
| 6,139,931 A | 10/2000 | Finkelstein et al. |
| 6,300,451 B1 | 10/2001 | Mehta et al. |
| 6,335,410 B1 | 1/2002 | Finlayson et al. |
| 6,372,847 B1 | 4/2002 | Wouters |
| 6,376,151 B1 | 4/2002 | Takahashi et al. |
| 6,524,712 B1 | 2/2003 | Schledjewski et al. |
| 6,579,580 B1 | 6/2003 | Yamada et al. |
| 6,599,597 B1 | 7/2003 | Bonk et al. |
| 6,620,472 B1 | 9/2003 | Shepard et al. |
| 6,673,404 B1 | 1/2004 | Yeh et al. |
| 6,680,361 B1 | 1/2004 | Cady et al. |
| 6,723,810 B2 | 4/2004 | Kolthammer et al. |
| 6,730,379 B2 | 5/2004 | Bonk et al. |
| 6,764,629 B2 | 7/2004 | Shepard et al. |
| 6,846,534 B2 | 1/2005 | Bonk et al. |
| 6,852,786 B2 | 2/2005 | Brandsch et al. |
| 6,945,279 B2 | 9/2005 | Baba et al. |
| 7,514,132 B2 | 4/2009 | Aida et al. |
| 8,084,109 B2 | 12/2011 | Gao |
| 8,652,624 B2 | 2/2014 | Subramanian et al. |
| 2002/0031628 A1 | 3/2002 | Zumbrum et al. |
| 2002/0179647 A1 | 12/2002 | Hall et al. |
| 2004/0056571 A1 | 3/2004 | Takata |
| 2004/0103967 A1 | 6/2004 | Majumdar et al. |
| 2004/0105945 A1 | 6/2004 | Jerrell |
| 2005/0048236 A1 | 3/2005 | Watkins et al. |
| 2006/0051537 A1 | 3/2006 | Katayama et al. |
| 2007/0065616 A1 | 3/2007 | Fauble |
| 2007/0141282 A1 | 6/2007 | Chang et al. |
| 2008/0008848 A1 | 1/2008 | Dick et al. |
| 2010/0085253 A1 | 4/2010 | Ferguson et al. |

FOREIGN PATENT DOCUMENTS

| | | | |
|---|---|---|---|
| FR | 2650777 A1 | 2/1991 | |
| JP | 19900024137 | 1/1990 | |
| JP | 19910049937 | 3/1991 | |
| JP | 1993146818 | 6/1993 | |
| JP | 1994087621 | 3/1994 | |
| JP | 1994123630 | 5/1994 | |
| JP | 1994152676 | 5/1994 | |
| JP | 1995329252 | 12/1995 | |
| JP | 1995329261 | 12/1995 | |
| JP | 1996145711 | 6/1996 | |
| JP | 1998109781 | 4/1998 | |
| JP | 2001202117 | 7/2001 | |
| JP | 2003011288 | 1/2003 | |
| JP | 2003059634 | 2/2003 | |
| JP | 2004268321 | 9/2004 | |
| JP | 2005335308 | 12/2005 | |
| WO | 99/33651 A1 | 7/1999 | |
| WO | 2006/128646 A2 | 12/2006 | |
| WO | 2007/062669 A1 | 6/2007 | |
| WO | WO 2007/070728 * | 6/2007 | ............ B32B 25/08 |
| WO | 2008/091847 A1 | 7/2008 | |

OTHER PUBLICATIONS

McNally et al.; "Determination of Optimum extrusion processing conditions for multilayer, low emission plastic fuel line systems using dual capillary rheometer tehniques."; Polymer Processing Research Centre; Annual Technical Conference—Society of Plastics Engineers; 1999; 57th vol. 1; 1275-1279; Society of Plastics Engineers.

PCT/US2008/082989 International Search Report and Written Opinion, Dec. 24, 2008.

PCT/US2008/082989 International Preliminary Report on Patentability, May 27, 2010.

* cited by examiner

ARTICLES AND METHODS OF MAKING THE SAME

REFERENCE TO RELATED APPLICATIONS

This application is a divisional application of U.S. application Ser. No. 12/742,494, filed on May 12, 2010, now to be issued as U.S. Pat. No. 8,652,624, which is a 371 application of International Application No. PCT/US2008/082989, filed on Nov. 10, 2008, which claims the benefit of U.S. Provisional Application No. 60/987,803, filed on Nov. 14, 2007, and fully incorporated herein by reference.

The invention relates to an article comprising at least two layers, where the first layer is formed from a first composition comprising an ethylene/α-olefin/diene interpolymer, an isoprene rubber (synthetic), a natural rubber, a butadiene rubber, a styrene butadiene rubber, a chloroprene rubber, a nitrile rubber, a hydrogenated nitrile rubber, a chlorinated polyethylene, a chlorosulfonated polyethylene, an ethylene/propylene rubber, an ethylene/diene copolymer, a fluoro rubber, a polyurethane, a silicone rubber, or a combination thereof; and wherein the second layer is formed from a second composition comprising a butyl rubber, a halobutyl rubber, a polyvinylidene chloride, a brominated polymer derived from a copolymer of isobutylene and p-methyl styrene, nitrile rubber, a chloroprene rubber, a chlorosulfonated polyethylene, a chlorinated polyethylene, a polyurethane, a fluoro rubber, or a combination thereof.

BACKGROUND

Conventional barrier structures, laminates and coextrusions contain gas barrier materials, such as foil, polyamide, ethylene vinyl alcohol (EVOH), polyvinylidene chloride (PVDC), polyethylene terephthalate (PET), and combinations of these materials with other resins. Such structures can be used in various applications, such as semi permeable membranes for the production of bladders for sports goods (including bladders for footwear, sports balls, seats, inner tubes and cushioning devices). However, these structures are relatively rigid, and do not provide elastomeric recovery properties, in addition to excellent barrier properties. Such structures are also frequently used in applications such as food packaging, where the package is discarded after opening and use. As a result, these structures and laminates are not designed to sustain significant levels of abuse and continued re-use for an extended period. There is a need for articles, such as films, with improved gas barrier properties, and with excellent elastomeric properties and physical abuse resistance, and which can be used for an extended periods. There is a further need for such articles for the manufacture of inner tubes and other bladder applications, which are operated at pressures higher than atmospheric pressure. Various applications use semi permeable membranes for the production of bladders for sports goods (including bladders for footwear, sports balls, seats, inner tubes and cushioning devices). The article of interest contains a super-gas which is prevented from permeating through the bladder membrane. However, there is a need for membranes that can be used as barriers to small molecular gases.

International Publication No. WO 2007/062669 discloses a tire comprising a carcass structure, which comprises at least one layer formed from a crosslinked elastomeric material having air barrier properties, and where said crosslinked elastomeric material is obtained by crosslinking an elastomeric composition comprising: (a) from 10 phr to 100 phr of at least one butyl rubber; (b) from 0 phr to 90 phr of at least one diene elastomeric polymer; (c) from 5 phr to 120 phr of at least one reinforcing filler; (d) from 2 phr to 20 phr of at least one copolymer of at least one ethylenically unsaturated carboxylic acid, or a derivative thereof, with at least one ethylenically unsaturated monomer, containing at least one polyoxyalkylene side chain (for example, see abstract).

U.S. Pat. No. 5,992,486 discloses a laminate suitable for use with a pneumatic tire having an inner liner or like air-impermeable layer capable of maintaining a requisite air pressure. One laminate includes laminated films and a rubber layer (R); the laminated films being made of a gas barrier layer (A) and an adhesive layer (B). The adhesive layer (B) is located on at least one side of the layer (A), and the layer (A) is formed of at least one member selected from polyamide resins, polyester resins, polyarylate resins, polyamide-based alloys and polyester-based alloys. The laminated films are irradiated, in at least one periphery, with an electron beam, and the adhesive layer (B) is heat-bonded to the rubber layer (R). Another laminate includes laminated films and a rubber layer (R); the laminated films being made of a rubber-adhering layer (D), an adhesive layer (B) and a gas barrier layer (A). The layers (D), (B) and (A) are laminated in this order, with a structure of at least three layers. The rubber-adhering layer (D) is formed of at least one polyolefin resin, the gas barrier layer (A) is formed of at least one member selected from polyamide resins, polyester resins, polyarylate resins, polyamide-based alloys and polyester-based alloys. The laminated films are irradiated in at least one periphery with an electron beam, and the rubber-adhering layer (D) is heat-bonded to the rubber layer (R) (see abstract).

U.S. Pat. No. 6,579,580 discloses a composite container having a barrier property, and comprising packaging material. The packaging material comprises a base material and a co-extruded laminate layered on the base material. The base material has a paper support, with an inner surface and an outer surface, and a polyolefin resin layer, attached on the outer surface of the paper support, and constituting an outermost layer of the container. The laminate consists of a polyolefin resin layer, a second adhesive layer, a barrier layer, a first adhesive layer, and another polyolefin resin layer, and is arranged in this order, and has five layers in total. The container is formed by co-extrusion of the respective fused resins onto the base material. The former polyolefin resin layer of the laminate is directly applied onto the inner surface of the paper support, the latter polyolefin resin layer of the laminate, constituting an innermost layer of the container, and the barrier layer comprising polyamide resin having an aromatic moiety (see abstract).

U.S. Pat. No. 6,139,931 discloses a multi-layer closure liner for carbonated beverage containers, and the like, which includes a gas barrier layer, a first tie layer on an upper surface of the gas barrier layer, a second tie layer on a lower surface of the gas barrier layer, a first polyolefinic resin layer on the upper surface of the first tie layer, and a second polyolefinic layer on the lower surface of the second tie layer. In the preferred embodiment, the gas barrier layer is ethylene vinyl alcohol copolymer (EVOH), the first and second tie layers are functionalized polyolefin, and the first and second polyolefinic resin layers are ethylene vinyl acetate (EVA). The layers defining the closure liner are preferably simultaneously formed using a co-extrusion process to prevent the gas barrier layer from being exposed to moisture (see abstract).

Japanese Patent Disclosure No. 2003-11288 discloses a multilayered structural that contains a resin composition (P)

layer that contains a gas barrier resin (A), having the oxygen transmission rate of less than, or equal to, 500 mL·20 μm/m²·day·atm (20° C., 65%; RH), a thermoplastic resin (B) having a carbon-carbon double bond, and a transition metal salt (C); and a resin composition (R) layer that contains a drying agent (D), and a thermoplastic resin (E). The content of the drying agent is from 0.1 to 50 weight percent. The thermoplastic resin (B) may be a copolymer of an aromatic vinyl compound and a diene compound. The gas barrier resin (A) may be at least one resin selected from a polyvinyl alcohol, a polyamide or a polyacrylonitrile.

U.S. Pat. No. 6,524,712 discloses a multilayer film which has at least one first layer (1) of a thermoplastic polyurethane, at least one second layer (2) of a thermoplastic elastomer, and optionally a third layer (3) of a thermoplastic polyurethane. The ratio of the water vapor permeability level of the first layer (1) to the water vapor permeability level of the second layer (2), of the multilayer film, is at least two. When the optional third layer (3) is present in the multilayer film, the first and third layers enclose the second layer.

U.S. Pat. No. 5,941,286 discloses automotive filler tubes fabricated from laminated rubbery structure of selected fluoropolymeric materials laminated with a rubbery copolymer, like an epichlorohydrin elastomer, to provide a flexible tubular article, permitting only negligible escape of confined volatile hydrocarbons. A FKM rubbery polymer forms a relatively thin inner layer in the tube, a THV polymer forms a relatively thin intermediate layer, and a relatively thick elastomeric polymer, e.g., ECO, forms a cover layer. In an alternative embodiment, a tube is formed from an inner layer of a THV fluoroplastic polymer and a cover layer of a relatively thick elastomeric polymer. The tubing is made by coextruding the FKM rubbery polymer and the THV fluoroplastic polymer, coating the THV fluoroplastic polymer layer with a binder, crosshead extruding the elastomeric polymer layer, and cutting the tubing to lengths. The lengths are given a partial cure in straight condition to cross-link the THV fluoroplastic layer to the FKM rubber polymer layer and to the elastomeric layer. The partially cured lengths of tubing are shaped and then fully cured.

French Patent Disclosure 2650777 (Abstract) discloses a flexible tubing having an inner tube made of a material of the NBR nitrile, PVC-nitrile NBR-PVC or hydrogenated HNBR nitrile rubber type and fluoroelastomers. An outer tube or protective layer, coextruded with the inner tube, is made of a material chosen from rubbers of the epichlorohydrin, chlorinated polyethylene CM, chlorosulphonated polyethylene CSM or ethylene acrylate type.

U.S. Publication No. 2002/0031628 discloses a flexure endurant composition of an elastomer reinforced with a continuous phase of microporous, expanded polytetrafluoroethylene (ePTFE) having a ratio of elastomer to PTFE of approximately 1:1 to 50:1, on a volume basis. Examples of common synthetic elastomers include silicones, urethanes, nitrile rubber, styrene-butadiene-styrene (SBR), chloroprene, phosphazenes, fluoroelastomers, perfluoroelastomers, perfluoropolyether elastomers, having a rubbery elastic modulus of less than $10^7$ Pa.

U.S. Publication No. 2007/0141282 discloses a multilayer composite that has at least one elastomer layer and at least one barrier layer. In various embodiments, the composite contains at least two elastomer layers, alternating with at least two barrier layers. In other embodiments, the composite comprises at least ten alternating barrier and elastomer layers. The barrier layer is made of an amorphous polymer, and is provided in the form of a film. Preferably, the amorphous polymer film has a gas transmittance rate (GTR) of less than 40 cc·mil/m2·day·atm; measured as nitrogen transmittance at 0% relative humidity at 23° C. Materials for the elastomeric layers include polyurethane elastomers, flexible polyolefins, styrenic thermoplastic elastomers, polyamide elastomers, polyamide-ether elastomers, ester-ether or ester-ester elastomers, flexible ionomers, thermoplastic vulcanizates, flexible poly(vinyl chloride) homopolymers and copolymers, and flexible acrylic polymers.

U.S. Publication No. 2007/0065616 discloses a flexible tubular article for transport of volatile hydrocarbons, permitting only negligible escape of such vapors, and comprising: (a) a relatively thin, inner layer of an elastomeric form of an FKM fluoropolymer, and (b) one of more relatively thin intermediate layers of a thermoplastic form of an THV fluoropolymer, extruded in tubular form over the inner FKM layer, and (c) a durable outer layer of an elastomeric polymer bonded to the outside surface of the intermediate layer and being coextensive therewith.

U.S. Pat. No. 4,776,909 discloses a coextrusion from rubber of hollow tubular structures with filament reinforcement for composites which can be formed into spliceless bodies for pneumatic tires. The composites can be formed from one, two, three or more rubber stocks and have portions or layers which can form the body plies, sidewalls, innerliners, stabilizer ply inserts, and, optionally, abrasion gum strips of tire bodies. Conventional tire sidewall rubber stocks typically have a rubber composition comprising the following types of rubbers in the percentage (by weight) ranges: NR, 20-50%; BR, 0-60%; SBR, 30-60%; and EPDM, 0-30%. A conventional tire body rubber stock typically has a rubber composition within the percentage (by weight) ranges: NR, 50-100%; BR, 30-60%; and SBR, 20-50%.

U.S. Pat. No. 5,049,220 discloses a method of preparing a pneumatic rubber tire having a decorative applique on the sidewall thereof, which comprises (a) applying the decorative applique to the sidewall of a cured tire, and (b) binding the decorative applique to the sidewall by the application of heat and pressure. The decorative applique comprises from about 25 weight percent to about 75 weight percent syndiotactic 1,2-polybutadiene, or blends of SPBD having melting points which are within the range of about 70° C. to about 160° C., and from about 25 weight percent to about 75 weight percent of at least one polydiene rubber, which is blended with the syndiotactic 1,2-polybutadiene, sulfur, zinc oxide and at least one pigment or colorant.

U.S. Pat. No. 4,967,818 discloses a method of preparing a pneumatic rubber tire having a decorative design on the sidewall thereof, which comprises (a) applying the decorative design to the sidewall of an uncured tire, and (b) curing the tire. The decorative design comprises from about 25 weight percent to about 75 weight percent syndiotactic 1,2-polybutadiene having a melting point, within the range of about 100° C. to about 160° C., and from about 25 weight percent to about 75 weight percent of at least one polydiene rubber, which is cocurable with said sydiotactic 1,2-polybutadiene, at least one pigment or colorant, sulfur, and zinc oxide.

U.S. Pat. No. 5,260,123 discloses block copolymers which comprise alternating blocks of (A) a polysiloxane; and (B) a copolymer of a 1,3-conjugated diene and a monovinyl aromatic compound. Cured elastomer compositions exhibiting surface release characteristics are obtained by curing a mixture comprising the above-described block copolymer in the presence of a curing system comprising a peroxide and sulfur. Multilayer elastomer structures useful in manufacturing articles from elastomeric materials also are described, wherein at least a portion of an outer layer of the multilayer elastomer structure has release characteristics and comprises the cured block copolymers of the present invention.

U.S. Pat. No. 5,957,164 discloses a barrier hose comprising an innermost tube of a thermoplastic vulcanizate. The innermost tube of thermoplastic vulcanizate is coextruded with a flexible polyamide barrier material as a second tube. A backing of thermoset rubber is extruded or calendared over the polyamide barrier tube. A reinforcement layer follows which is then covered with an EPDM outer cover.

U.S. Patent 2002/0179647 discloses a hydration system for providing fluid to a user. The system comprises a bladder, configured to hold a fluid, which comprises an outer layer of a fluorinated rubber composite. An inner bladder layer may comprise a thermoplastic polymer, and an outer bladder, encompassing the inner bladder, may comprise a fluorinated rubber. The inner bladder layer may be comprised of thermoplastic polyurethane. The outer bladder may be comprised of a multiplayer laminate of the fluorinated rubber layer, a polyamide reinforcement layer, and a thermoplastic polymer layer.

Additional films, laminates and/or tubes are described in International Publications Nos. WO2004/050358, WO2005/068191, WO2002/29299 and WO2008/091847; Japanese Patent Application Disclosure Nos. JP2004268321, JP2005335309, JP 6-328629, JP3288084A (Abstract), JP3049937A (Abstract) and JP2024137A (Abstract); Japanese Patent Application Disclosure Bulletin Nos. JP 7-329252, JP 7-329261; Japanese Patent Application Nos. 8-145711, and H10-109781; U.S. Publication Nos. 2004/0105945, 2004/0103967 and US2005/0048236.

Butyl rubber has good barrier property for small molecular gases, and is typically used for inner tube applications. Current applications use a blend containing from 15% to 25% EPDM, and from 75% to 85% butyl rubber, to maintain acceptable barrier property and reduce cost. However, there is a need to further reduce butyl rubber usage, or replace butyl rubber with EPDM and/or other elastomeric polymers, to reduce cost. There is a further need for articles that achieve much better barrier properties than the incumbent articles prepared from conventional polymer blends, such as a butyl/EPDM blend. There is an additional need for articles with improved temperature and ozone resistance relative to the incumbent butyl/EPDM blend. These needs and others have been met by the following invention.

SUMMARY OF THE INVENTION

The invention provides an article comprising a first layer and a second layer, and wherein the first layer is formed from a first composition comprising an ethylene/α-olefin/diene interpolymer, an isoprene rubber (synthetic), a natural rubber, a butadiene rubber, a styrene butadiene rubber, a chloroprene rubber, a nitrile rubber, a hydrogenated nitrile rubber, a chlorinated polyethylene, a chlorosulfonated polyethylene, an ethylene/propylene rubber, an ethylene/diene copolymer, a fluoro rubber, a polyurethane, a silicone rubber, or a combination thereof; and wherein the second layer is formed from a second composition comprising a butyl rubber, a halobutyl rubber, polyvinylidene chloride, a brominated polymer derived from a copolymer of isobutylene and p-methyl styrene, nitrile rubber, a chloroprene rubber, a chlorosulfonated polyethylene, a chlorinated polyethylene, a polyurethane, a fluoro rubber, or a combination thereof.

DETAILED DESCRIPTION OF THE INVENTION

The invention provides articles that have better barrier properties than articles formed from incumbent blends containing butyl rubber and an EPDM (ethylene/propylene/diene modified). The articles should also afford improved temperature and ozone resistance, relative to the incumbent butyl rubber/EPDM blends. The articles may contain higher levels of EPDM, and, based on the improved oxygen barrier properties, should be producible at lower thicknesses than the incumbent articles. These features, in turn, will lower the manufacturing cost of the articles.

Butyl rubber (or other elastomeric polymers or compounds having barrier property at least as good as butyl rubber) can be coextruded with EPDM, and/or other elastomeric polymers, to achieve excellent barrier properties and good adhesion. The inventive articles are especially suited for inner tube applications.

In one embodiment, elastomeric polymers or compounds, with OTR (Oxygen Transmission Rate) no greater than 550 $cc/m^2/day$ at ambient atmosphere are co-extruded with EPDM to form an article containing at least two layers. These layered articles have better barrier properties than monolayer articles formed from incumbent butyl rubber/EPDM blends, and are especially suited for the manufacture of inner tubes. A typical inner tube thickness is in the range of 0.8 mm to 2.6 mm.

Butyl rubber can be coextruded with EPDM to reduce the content of butyl rubber, in the final structure, from 75 weight percent to 51.3 weight percent. The resulting coextruded structure has better barrier properties than the incumbent blend (25 weight percent EPDM plus 75 weight percent butyl rubber).

As discussed above, the invention provides an article comprising a first layer and a second layer, and wherein the first layer is formed from a first composition comprising an ethylene/α-olefin/diene interpolymer, an isoprene rubber (synthetic), a natural rubber, a butadiene rubber, a styrene butadiene rubber, a chloroprene rubber, a nitrile rubber, a hydrogenated nitrile rubber, a chlorinated polyethylene, a chlorosulfonated polyethylene, an ethylene/propylene rubber, an ethylene/diene copolymer, a fluoro rubber, a polyurethane, a silicone rubber, or a combination thereof; and wherein the second layer is formed from a second composition comprising a butyl rubber, a halobutyl rubber, a polyvinylidene chloride, a brominated polymer derived from a copolymer of isobutylene and p-methyl styrene, a nitrile rubber, a chloroprene rubber, a chlorosulfonated polyethylene, a chlorinated polyethylene, a polyurethane, a fluoro rubber, or a combination thereof.

In one embodiment, the first composition is different from the second composition. For example, the first composition comprises a polymer type different from that of the second composition.

In one embodiment, the article comprises at least a first layer and a second layer.

In one embodiment, the article is formed using a melt process. In a further embodiment, the article is formed using a process selected from a coextrusion process, a lamination process or a cast film process. In a further embodiment, the article is formed using a process selected from a coextrusion process.

In one embodiment, the article is formed using a compression molding process.

In one embodiment, the first layer and the second layer are contiguous and in direct contact.

In one embodiment, the first layer comprises a fluoro rubber. In a further embodiment, the fluoro rubber is a crosslinkable fluoro rubber (fluoro rubber capable of forming chemical bonds between polymer chains to form a network structure).

In one embodiment, the second layer comprises a fluoro rubber. In a further embodiment, the fluoro rubber is a crosslinkable fluoro rubber.

In one embodiment, the first layer and the second layer, each, independently, comprises a fluoro rubber. In a further embodiment, the fluoro rubber is a crosslinkable fluoro rubber.

In one embodiment, the first layer comprises a polyurethane. In a further embodiment, the polyurethane is a crosslinkable polyurethane rubber (polyurethane capable of forming chemical bonds between polymer chains to form a network structure).

In one embodiment, the second layer comprises a polyurethane. In a further embodiment, the polyurethane is a crosslinkable polyurethane rubber.

In one embodiment, the first layer and the second layer, each, independently, comprises a polyurethane. In a further embodiment, the polyurethane is a crosslinkable polyurethane rubber.

In one embodiment, the article does not contain (comprise) a reinforcing material, such as a woven fabric, a nonwoven fabric and/or a metal.

In one embodiment, the article does not contain (comprise) a fiber reinforcing material.

In one embodiment, the article does not contain (comprise) a polyamide.

In one embodiment, the article does not contain (comprise) a polyester.

In one embodiment, the article does not contain (comprise) a polyvinyl alcohol.

In one embodiment, the article does not contain (comprise) a block copolymer.

In one embodiment, the article does not contain (comprise) a polymer selected from a polyamide, a polyester, a polyvinyl alcohol, or a block copolymer.

In one embodiment, first composition comprises a first polymer selected from the group consisting of an ethylene/α-olefin/diene interpolymer, an isoprene rubber (synthetic), a natural rubber, a butadiene rubber, a styrene butadiene rubber, a chloroprene rubber, a nitrile rubber, a hydrogenated nitrile rubber, a chlorinated polyethylene, a chlorosulfonated polyethylene, an ethylene/propylene rubber, an ethylene/diene copolymer, a fluoro rubber, a polyurethane rubber, and a silicone rubber; and wherein the second composition comprises a polymer selected from the group consisting of a butyl rubber, a halobutyl rubber, a polyvinylidene chloride, a brominated polymer derived from a copolymer of isobutylene and p-methyl styrene, a nitrile rubber, a chloroprene rubber, a chlorosulfonated polyethylene, a chlorinated polyethylene, a polyurethane, and a fluoro rubber; and wherein the first polymer is different from the second polymer. For example, the first polymer is of a polymer type different from the second polymer.

In one embodiment, the second layer is formed from a second composition comprising a butyl rubber, a halobutyl rubber, a polyvinylidene chloride, a brominated polymer derived from a copolymer of isobutylene and p-methyl styrene, a nitrile rubber, or a combination thereof.

In one embodiment, the second layer is formed from a second composition comprising a butyl rubber, a halobutyl rubber, a polyvinylidene chloride, a nitrile rubber, or a combination thereof.

In one embodiment, the second layer is formed from a second composition comprising a butyl rubber, a polyvinylidene chloride, or a combination thereof.

In one embodiment, the second layer is formed from a second composition comprising a butyl rubber.

In one embodiment, the second layer is formed from a second composition comprising a polyvinylidene chloride.

In one embodiment, the first layer is formed from a first composition comprising an ethylene/α-olefin/diene interpolymer, an isoprene rubber (synthetic), a natural rubber, a butadiene rubber, a styrene butadiene rubber, an ethylene/propylene rubber, an ethylene/diene copolymer, a silicone rubber, or a combination thereof.

In one embodiment, the first layer is formed from a first composition comprising an ethylene/α-olefin/diene interpolymer, an isoprene rubber (synthetic), a natural rubber, a butadiene rubber, a styrene butadiene rubber, an ethylene/propylene rubber, a silicone rubber, or a combination thereof.

In one embodiment, the first layer is formed from a first composition comprising an ethylene/α-olefin/diene interpolymer, a natural rubber, a butadiene rubber, a styrene butadiene rubber, or a combination thereof.

In one embodiment, the first layer is formed from a first composition comprising an ethylene/α-olefin/diene interpolymer, a styrene butadiene rubber, or a combination thereof.

In one embodiment, the first layer is formed from a first composition comprising an ethylene/α-olefin/diene interpolymer.

In one embodiment, the second layer is adjacent to the first layer.

In one embodiment, the article comprises at least three layers.

In one embodiment, the article further comprises a third layer formed from a third composition comprising an ethylene/α-olefin/diene interpolymer. In a further embodiment, the second layer is between the first layer and the third layer. In yet a further embodiment, the first layer is formed from a composition comprising an ethylene/α-olefin/diene interpolymer. In a further embodiment, the second layer is formed from a composition comprising a butyl rubber. In another embodiment, the second layer is formed from a composition comprising a polyvinylidene chloride.

In one embodiment, the first layer is formed from a composition comprising an ethylene/α-olefin/diene interpolymer, and the ethylene/α-olefin/diene interpolymer is an ethylene/propylene/diene interpolymer. In a further embodiment, the diene is 5-ethylidene-2-norbornene.

In one embodiment, the article has an Oxygen Transmission rate (OTR) less than, or equal to, 600 cc/m$^2$/day at ambient atmosphere.

In one embodiment, the article has an Oxygen Transmission rate (OTR) less than, or equal to, 550 cc/m$^2$/day at ambient atmosphere.

In one embodiment, the first layer has a thickness from 10 to 99 percent, preferably from 15 to 75 percent, and more preferably from 25 to 55 percent, based on the sum thickness of the first layer and the second layer.

In one embodiment, the second layer has a thickness from 1 to 90 percent, preferably from 25 to 85 percent, and more preferably from 45 to 75 percent, based on the sum thickness of the first layer and the second layer.

In one embodiment, the first layer is present in an amount from 10 to 99 percent, preferably from 15 to 75 percent, and more preferably from 25 to 55 percent, based on the sum thickness of the first layer and the second layer.

In one embodiment, the second layer is present in an amount from 1 to 90 percent, preferably from 25 to 85 percent, and more preferably from 40 to 75 percent, based on the sum thickness of the first layer and the second layer.

In one embodiment, the first layer is present in an amount from 25 to 50 percent, or 25 to 45 percent, based on the sum thickness of the first layer and the second layer; and the second layer is present in an amount from 50 to 75 percent, or 55 to 75 percent, based on the sum thickness of the first layer and the second layer.

In one embodiment, the total thickness of the article is less than, or equal to, 3500 microns, preferably less than, or equal to, 3000 microns, and more preferably less than, or equal to, 2600 microns.

In one embodiment, the total thickness of the article is greater than, or equal to, 50 microns, preferably greater than, or equal to, 100 microns, and more preferably greater than, or equal to, 200 microns.

In one embodiment, the total thickness of the article is greater than, or equal to, 50 microns, preferably greater than, or equal to, 80 microns.

In one embodiment, the article consists of two layers. In another embodiment, the article consists of three layers.

In one embodiment, the article consists of at least three layers.

In one embodiment, the article is selected from a film or a coating. An inventive film comprises at least two layers, and is thus a multilayered film.

In one embodiment, the article is a film.

In one embodiment, the article is a coating.

An inventive article may comprise a combination of two or more embodiments as described herein.

The first composition may comprise a combination of two or more embodiments as described herein.

The second composition may comprise a combination of two or more embodiments as described herein.

Butyl Rubber

Butyl rubber is a copolymer of an isobutene and a conjugated diene. In one embodiment, these copolymers contain from about 0.5 to about 5 weight percent conjugated diene, based on the total weight of polymerizable monomers. In one embodiment, these copolymers contain from about 0.5 to about 5 weight percent conjugated diene, based on the weight of the copolymer. Suitable conjugated dienes include isoprene, butadiene, dimethyl butadiene, piperylene, and the like. The preferred diene is isobutylene.

Commercial butyl rubber is a copolymer of isobutylene and minor amounts of isoprene. It is generally prepared in a slurry process using methyl chloride, as a polymerization diluent, and a Friedel-Crafts catalyst, such as $AlCl_3$, as the polymerization initiator. The polymerization is generally carried out at temperatures of about $-90°$ C. to $-100°$ C.

Commercially available butyl rubber grades, particularly suited for used in inner tubes applications, include butyl rubbers from ExxonMobil Chemical, such as BUTYL 268; butyl rubbers from Lanxess, such as BUTYL 301; butyl rubbers from Neznikamsh Russia, such as BK-1675 N; and butyl rubbers from Yanchan China, such as RR-1751.

In one embodiment, the butyl rubber has a Mooney Viscosity, ML(1+8) at 125° C., greater than 30, preferably greater than 40, and more preferably greater than 50.

In one embodiment, the butyl rubber has a Mooney Viscosity, ML(1+8) at 125° C., less than 150, preferably less than 120, and more preferably less than 100.

In one embodiment, the butyl rubber has a Mooney Viscosity (ML 1+8 at 125° C.) from 30 to 150, preferably from 40 to 120, and more preferably from 50 to 100.

In one embodiment, the butyl rubber comprises from 1.0 to 3.0 mole percent polymerized isoprene, based on the total moles of polymerizable monomers.

A butyl rubber may have a combination of two or more embodiments as described herein.

Ethylene/α-Olefin/Diene Interpolymer

The ethylene/α-olefin/diene interpolymers (EAODMs) have polymerized therein ethylene, at least one α-olefin (for example, a C3-C20α-olefin monomer), and a diene (for example, a C4-C40 diene monomer). The α-olefin may be either an aliphatic or an aromatic compound, and may contain vinylic unsaturation or a cyclic compound, such as styrene, p-methyl styrene, cyclobutene, cyclopentene, and norbornene, including norbornene substituted in the 5 and 6 position with C1-C20 hydrocarbyl groups. Ethylenically unsaturated monomers include 4-vinylcyclohexene, vinyl-cyclohexane, and C3-C10 aliphatic α-olefins (especially propylene, isobutylene, 1-butene, 1-pentene, 1-hexene, 3-methyl-1-pentene, 4-methyl-1-pentene, 1-octene, 1-decene and 1-dodecene). The α-olefin is preferably a C3-C20 aliphatic compound, preferably a C3-C12 aliphatic compound, and more preferably a C3-C8 aliphatic compound. A more preferred C3-C10 aliphatic α-olefin is selected from the group consisting of propylene, 1-butene, 1-hexene and 1-octene, and more preferably propylene. In a preferred embodiment, the ethylene/α-olefin/diene interpolymer is an EPDM interpolymer. In a further embodiment, the diene is 5-ethylidene-2-norbornene (ENB).

In one embodiment, the ethylene/α-olefin interpolymer of the present invention has a C2 content (polymerized ethylene) from 30 to 95 weight percent, more preferably from 50 to 95 weight percent, and most preferably from 55 to 95 weight percent, or from 60 to 95 weight percent, based on the total weight of polymerizable monomers. In one embodiment, the ethylene/α-olefin interpolymer of the present invention has a C2 content (polymerized ethylene) from 30 to 95 weight percent, more preferably from 50 to 95 weight percent, and most preferably from 55 to 95 weight percent, or from 60 to 95 weight percent, based on the weight of the interpolymer. In one embodiment, interpolymers also contain at least one α-olefin, and preferably propylene, typically at a level of from 10 to 70 weight percent, more preferably from 10 to 50 weight percent, and most preferably from 10 to 45 weight percent, or 10 to 40 weight percent, based on the total weight of polymerizable monomers. In one embodiment, interpolymers also contain at least one α-olefin, and preferably propylene, typically at a level of from 10 to 70 weight percent, more preferably from 10 to 50 weight percent, and most preferably from 10 to 45 weight percent, or 10 to 40 weight percent, based on the weight of the interpolymer.

In one embodiment, the interpolymer contains a non-conjugated diene, and the non-conjugated diene content is preferably from 0.5 to 25 weight percent, more preferably from 1 to 20 weight percent, and most preferably from 2 to 15 weight percent, based on total weight of polymerizable monomers. In one embodiment, the interpolymer contains a non-conjugated diene, and the non-conjugated diene content is preferably from 0.5 to 25 weight percent, more preferably from 1 to 20 weight percent, and most preferably from 2 to 15 weight percent, based on the weight of the interpolymer.

In another embodiment, more than one diene may be incorporated simultaneously, for example 1,4-hexadiene and ENB, with total diene incorporation within the limits specified above.

In one embodiment, the diene monomer is a non-conjugated diolefin. The polymerized non-conjugated diene may be used as a cure site for cross-linking. The nonconjugated diolefin can be a C6-C15 straight chain, branched chain or cyclic hydrocarbon diene. Illustrative non-conjugated dienes are straight chain acyclic dienes, such as 1,4-hexadiene and 1,5-heptadiene; branched chain acyclic dienes such as 5-methyl-1,4-hexadiene, 2-methyl-1,5-hexadiene, 6-methyl-1,5-heptadiene, 7-methyl-1,6-octadiene, 3,7-dimethyl-1,6-octadiene, 3,7-dimethyl-1,7-octadiene, 5,7-dimethyl-1,7-octadiene, 1,9-decadiene, and mixed isomers of dihydromyrcene; single ring alicyclic dienes such as 1,4-cyclohexadiene, 1,5-cyclooctadiene and 1,5-cyclododecadiene; multi-ring alicyclic fused and bridged ring dienes such as tetrahydroindene, methyl tetrahydroindene; alkenyl, alkylidene, cycloalkenyl and cycloalkylidene norbornenes such as 5-methylene-2-norbornene (MNB), 5-ethylidene-2-norbornene (ENB), 2-vinyl-5-norbornene (VNB), 5-propenyl-2-norbornene, 5-isopropylidene-2-norbornene, 5-(4-cyclopentenyl)-2-norbornene and 5-cyclohexylidene-2-norbornene. The diene is preferably a nonconjugated diene selected from the group consisting of ENB, dicyclopentadiene, 1,4-hexadiene, 7-methyl-1,6-octadiene, VNB, and preferably, ENB, dicyclopentadiene and 1,4-hexadiene, VNB, more preferably ENB, VNB and dicyclopentadiene, and even more preferably ENB.

In one embodiment, the diene is a conjugated diene selected from the group consisting of 1,3-pentadiene, 1,3-butadiene, 2-methyl-1,3-butadiene, 4-methyl-1,3-pentadiene, or 1,3-cyclopentadiene. The diene monomer content, whether it comprises a conjugated diene, a non-conjugated diene or both, may fall within the limits specified above for non-conjugated dienes.

Although preferred ethylene/α-olefin/diene interpolymers are substantially free of any diene monomer that typically induces LCB, one may include such a monomer if costs are acceptable, and desirable interpolymer properties, such as, for example, processability, tensile strength or elongation, do not degrade to an unacceptable level. Such diene monomers include dicyclopentadiene, NBD, methyl norbornadiene, vinyl-norbornene, 1,6-heptadiene, 1,7-octadiene, and 1,9-decadiene. Typically, such monomers are added in an amount within a range of from greater than zero to 3 weight percent, more preferably from 0.01 to 2 weight percent, based on total weight of polymerizable monomers.

Preferred interpolymers of the present invention have polymerized therein ethylene, at least one α-olefin, and 5-ethylidene-2-norbornene (ENB). The α-olefin is preferably a C3-C20 aliphatic compound, more preferably a C3-C12 aliphatic compound, and even more preferably a C3-C8 aliphatic compound. The α-olefins include propylene, 1-butene, 1-pentene, 1-hexene, 3-methyl-1-pentene, 4-methyl-1-pentene, 1-heptene, 1-octene, 1-decene and 1-dodecene. More preferred α-olefins include propylene, 1-butene, 1-hexene and 1-octene, and most preferably propylene. In a preferred embodiment, the interpolymer has polymerized therein ethylene, propylene and 5-ethylidene-2-norbornene (ENB).

In one embodiment, the amount of ENB in the interpolymers of the invention is from 0.5 to 15 weight percent, preferably from 1 to 10 weight percent, and more preferably from 2 to 8 weight percent, based on the total weight of polymerizable monomers.

In one embodiment, the amount of ENB in the interpolymers of the invention is from 0.5 to 15 weight percent, preferably from 1 to 10 weight percent, and more preferably from 2 to 8 weight percent, based on the weight of the interpolymer.

In one embodiment, the α-olefin is preferably selected from the group consisting of C3 to C20α-olefins, C3 to C12α-olefins, and C3-C8α-olefins, and more preferably C3-C8α-olefins. In a further embodiment, the α-olefin is selected from the group consisting of propylene, 1-butene, 2-methyl-1-propene, 1-pentene, 2-methyl-1-butene, 1-hexene, 4-methyl-1-pentene, 1-heptene, and 1-octene, and preferably propylene, 1-butene, 1-hexene and 1-octene. In a preferred embodiment, the α-olefin is propylene.

The term "interpolymer," as used herein, refers to polymers prepared by the polymerization of at least two different types of monomers. The generic term interpolymer thus includes copolymers, employed to refer to polymers prepared from two different types of monomers, and polymers prepared from more than two different types of monomers.

The term "5-ethylidene-2-norbornene (or ENB)," as used herein, refers to two isomeric forms of 5-ethylidene-2-norbornene ((E)-5-ethylidenebicyclo[2.2.1]hept-2-ene and (Z)-5-ethylidenebicyclo[2.2.1]hept-2-ene). Commercial products of 5-ethylidene-2-norbornene (or ENB) typically have a purity in the range of 95 weight percent to 99.9 weight percent, and where the level of purity is based on the amounts of the two isomeric forms of 5-ethylidene-2-norbornene.

In one embodiment, the ethylene/α-olefin/diene interpolymer, EAODM (and preferably an EPDM), is a homogeneously branched linear interpolymer or a homogeneously branched substantially linear interpolymer. In yet another embodiment, the ethylene/α-olefin/diene interpolymer (and preferably an EPDM) is a homogeneously branched substantially linear interpolymer. In yet another embodiment, the ethylene/α-olefin/diene interpolymer (and preferably an EPDM) is a homogeneously branched linear interpolymer.

In one embodiment, the ethylene/α-olefin/diene interpolymer is used in a dry form, without an oil extender. In another embodiment, the ethylene/α-olefin/diene interpolymer polymer is an EPDM interpolymer, which is used in a dry form, without an oil extender. In a further embodiment, the diene is 5-ethylidene-2-norbornene (ENB).

In general, polymerization may be accomplished at conditions well known in the art for Ziegler-Natta or Kaminsky-Sinn type polymerization reactions, that is, temperatures from 0° C. to 250° C., preferably from 30° C. to 200° C., and pressures from atmospheric to 10,000 atmospheres. Polymerizations may also be conducted in accordance with processes disclosed in U.S. Pat. No. 6,680,361 (equivalent of International Publication No. WO 00/26268), fully incorporated herein by reference. Polymerizations may be performed using a suspension, solution, slurry, or gas phase polymerization, or combinations thereof. In one embodiment, the polymerization is conducted in a solution loop reactor, or is conducted in a gas phase reactor. In another embodiment, a solution fed catalyst is used in a solution polymerization or in a gas phase polymerization. In another embodiment, the catalyst is supported on a support, such as, silica, alumina, or a polymer (especially poly(tetrafluoroethylene) or a polyolefin), and may be spray dried onto such supports, and introduced in supported form into a polymerization reactor.

The polymerization may take place in any suitable type of reactor, and preferably a reactor design that would allow one skilled in the art to determine catalyst efficiency. Reactors include, but are not limited to, batch reactors, continuous reactors, pilot plant reactors, a laboratory scale reactors, a high throughput polymerization reactors, and other types of commercial reactors.

Inert liquids are suitable solvents for polymerization. Examples include straight-chain and branched-chain hydrocarbons, such as isobutane, butane, pentane, hexane, heptane, octane, and mixtures thereof; cyclic and alicyclic hydrocarbons, such as cyclohexane, cycloheptane, methylcyclohexane, methylcycloheptane, and mixtures thereof; perfluorinated hydrocarbons, such as perfluorinated C4-C10 alkanes; and aromatic and alkyl-substituted aromatic compounds, such as benzene, toluene, xylene, and ethylbenzene. Suitable solvents also include liquid olefins that may act as monomers or comonomers including butadiene, cyclopentene, 1-hexene, 4-vinyl-cyclohexene, vinylcyclohexane, 3-methyl-1-pentene, 4-methyl-1-pentene, 1,4-hexadiene, 1-octene, 1-decene, styrene, divinylbenzene, allylbenzene, and vinyltoluene (including all isomers alone or in admixture). Mixtures of the foregoing are also suitable. If desired, normally gaseous olefins can be converted to liquids by application of pressure, and used herein.

Suitable catalysts for use herein, preferably include constrained geometry catalysts, as disclosed in U.S. Pat. Nos. 5,272,236 and 5,278,272, which are both incorporated herein, in their entirety, by reference. The monocyclopentadienyl transition metal olefin polymerization catalysts taught in U.S. Pat. No. 5,026,798, the teachings of which are incorporated herein by reference, are also suitable as catalysts of the invention.

The foregoing catalysts may be further described as comprising a metal coordination complex, comprising a metal of groups 3-10 or the Lanthanide series of the Periodic Table of the Elements, and a delocalized π-bonded moiety, substituted with a constrain-inducing moiety, said complex having a constrained geometry about the metal atom, such that the angle at the metal between the centroid of the delocalized, substituted π-bonded moiety, and the center of at least one remaining substituent, is less than such angle in a similar complex, containing a similar π-bonded moiety lacking in such constrain-inducing substituent. In addition, for such complexes comprising more than one delocalized, substituted x-bonded moiety, only one thereof, for each metal atom of the complex, is a cyclic, delocalized, substituted π-bonded moiety. The catalyst further comprises an activating cocatalyst. Preferred catalyst complexes correspond to the Structure I:

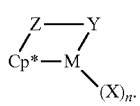
(Structure I)

In Structure I, M is a metal of group 3-10, or the Lanthanide series of the Periodic Table of the Elements;
Cp* is a cyclopentadienyl or substituted cyclopentadienyl group bound in an n5 bonding mode to M;
Z is a moiety comprising boron, or a member of group 14 of the Periodic Table of the Elements, and optionally sulfur or oxygen, said moiety having up to 20 non-hydrogen atoms, and optionally Cp* and Z together form a fused ring system;
X independently each occurrence is an anionic ligand group or neutral Lewis base ligand group having up to 30 non-hydrogen atoms;
n is 0, 1, 2, 3, or 4 and is 2 less than the valence of M; and
Y is an anionic or nonanionic ligand group bonded to Z and M comprising nitrogen, phosphorus, oxygen or sulfur, and having up to 20 non-hydrogen atoms, optionally Y and Z together form a fused ring system. More specific complexes are described in U.S. Pat. Nos. 5,272,236 and 5,278,272, incorporated herein by reference.

Specific compounds include: (tert-butylamido) (tetramethyl-η5-cyclopentadienyl)-1,2-ethanediylzirconium dichloride, (tert-butylamido)(tetramethyl-η5-cyclopentadienyl) 1,2-ethanediyltitanium dichloride, (methylamido)(tetramethyl-η5-cyclopentadienyl)-1,2-ethanediylzirconium dichloride, (methylamido) (tetramethyl-η5 cyclopentadienyl)-1,2-ethanediyltitanium dichloride, (ethylamido)(tetramethyl-η5-cyclopentadienyl)-methylenetitanium dichloro, (tertbutylamido)dibenzyl(tetramethyl-η5-cyclopentadienyl) silanezirconium dibenzyl, (benzylamido)dimethyl(tetramethyl-η5-cyclopentadienyl) silanetitanium dichloride, (phenylphosphido) dimethyl(tetramethyl η5-cyclopentadienyl)silanezirconium dibenzyl, (tertbutylamido) dimethyl(tetramethyl-η5-cyclopentadienyl) silanetitanium dimethyl, and the like.

The complexes may be prepared by contacting a derivative of a metal, M, and a group I metal derivative or Grignard derivative of the cyclopentadienyl compound, in a solvent, and separating the salt byproduct. Suitable solvents for use in preparing the metal complexes are aliphatic or aromatic liquids, such as cyclohexane, methylcyclohexane, pentane, hexane, heptane, tetrahydrofuran, diethyl ether, benzene, toluene, xylene, ethylbenzene, etc., or mixtures thereof.

Suitable cocatalysts for use herein include polymeric or oligomeric aluminoxanes, especially methyl aluminoxane, as well as inert, compatible, noncoordinating, ion forming compounds. The so-called modified methyl aluminoxane (MMAO) is also suitable for use as a cocatalyst. One technique for preparing such modified aluminoxane is disclosed in U.S. Pat. No. 5,041,584, the teachings of which are incorporated herein by reference. Aluminoxanes can also be made, as disclosed in U.S. Pat. Nos. 4,544,762; 5,015,749; and 5,041,585, the entire contents of each are incorporated herein by reference. Preferred cocatalysts are inert, noncoordinating, boron compounds, or aluminoxanes.

In addition to constrained geometry catalysts, additional single site catalyst systems that are suitable for use herein, include metallocene catalyst systems and post metallocene catalyst systems.

Metallocene catalysts are, for example, coordination complexes between a transition metal, usually from group IV, in particular, titanium, zirconium or hafnium, and two, optionally substituted, cyclopentadienyl ligands. These catalysts are used in combination with a co-catalyst, for example an aluminoxane, preferably methylaluminoxane, or a boron compound (see, for example, Adv. Organomet. Chem, Vol. 18, p. 99, 10 (1980); Adv. Organomet. Chem, Vol. 32, p. 325, (1991); J.M.S.-Rev. Macromol. Chem. Phys., Vol. C34(3), pp. 439-514, (1994); J. Organometallic Chemistry, Vol. 479, pp. 1-29, (1994); Angew. Chem. Int., Ed. Engl., Vol. 34, p. 1143, (1995) Prog. Polym. Sci., Vol. 20, p. 459 15 (1995); Adv. Polym. Sci., Vol. 127, p. 144, (1997); U.S. Pat. No. 5,229,478, or International applications WO 93/19107, EP 129 368, EP 277 003, EP 277 004, EP 632 065).

The ethylene/α-olefin/diene interpolymers of the invention may be branched or unbranched interpolymers. The presence or absence of branching in the ethylene/α-olefin interpolymers, and if branching is present, the amount of branching, can vary widely, and may depend on the desired processing conditions and the desired polymer properties.

The nature of the ethylene/α-olefin/diene branching can vary for convenience. The ability to incorporate LCB (long chain branching) into polymer backbones is known. In U.S. Pat. No. 3,821,143, a 1,4-hexadiene was used as a branching monomer to prepare ethylene/propylene/diene (EPDM) polymers having LCB. Such branching agents are sometimes referred to as H branching agents. U.S. Pat. Nos. 6,300,451 and 6,372,847 also use various H type branching agents to prepare polymers having LCB. In U.S. Pat. No. 5,278,272, it was discovered that constrained geometry catalysts (CGC) have the ability to incorporate vinyl terminated macromonomers into the polymer backbone to form LCB polymers. Such branching is referred to as T type branching. Each of these patents (U.S. Pat. Nos. 3,821,143; 6,300,451; 6,372,847 and 5,278,272) is fully incorporated herein by reference.

In one embodiment, the type of LCB in the interpolymers is T-type branching, as opposed to H-type branching. T-type branching is typically obtained by copolymerization of ethylene and comonomer(s) with chain end unsaturated macromonomers, in the presence of a constrained geometry catalyst, under the appropriate reactor conditions, such as, for example, those described in WO 00/26268 (U.S. equivalent, U.S. Pat. No. 6,680,361) or U.S. Pat. No. 5,728,272, each fully incorporated herein in by reference). If extremely high levels of LCB are desired, H-type branching is the preferred method, since T-type branching has a practical upper limit to the degree of LCB. The T-type LCB polymers can be produced by constrained geometry catalysts, without measurable gels, but with very high levels of T-type LCB. Because the macromonomer being incorporated into the growing polymer chain has only one reactive unsaturation site, the resulting polymer only contains side chains of varying lengths, and at different intervals along the polymer backbone.

H-type branching is typically obtained by copolymerization of ethylene or other alpha olefins with a diene having two double bonds reactive with a nonmetallocene type of catalyst in the polymerization process. As the name implies, the diene attaches one polymer molecule to another polymer molecule through a diene bridge; the resulting polymer molecule resembling an H that might be described as more of a crosslink than a long chain branch. H-type branching is typically used when extremely high levels of branching are desired. If too much diene is used, the polymer molecule can form so much branching or crosslinking that the polymer molecule is no longer soluble in the reaction solvent (in a solution process), and consequently falls out of solution, resulting in the formation of gel particles in the polymer.

Additionally, use of H-type branching agents may deactivate metallocene catalysts, and reduce catalyst efficiency. Thus, when H-type branching agents are used, the catalysts used are typically not metallocene catalysts. U.S. Pat. No. 6,372,847 discloses the use of vanadium type catalysts to prepare H-type branched polymers.

Examples of suitable ethylene/α-olefin/diene interpolymers for use in the invention include NORDEL hydrocarbon rubbers available from The Dow Chemical Company.

In one embodiment, the ethylene/α-olefin/diene interpolymer (and preferably an EPDM) has a molecular weight distribution (Mw/Mn) less than 15, preferably less than 10, and more preferably less than 7. In a further embodiment, the diene is ENB.

In one embodiment, the ethylene/α-olefin/diene interpolymer (and preferably an EPDM) has a molecular weight distribution (Mw/Mn) greater than 1.1, preferably greater than 1.5, and more preferably greater than 2. In a further embodiment, the diene is ENB.

In one embodiment of the invention, the ethylene/α-olefin/diene interpolymer (EAODM) has a molecular weight distribution (Mw/Mn) from 1.1 to 15, more preferably from 1.2 to 10 and most preferably from 1.5 to 7. All individual values and subranges from 1.1 to 15 are included herein and disclosed herein. In a preferred embodiment, the ethylene/α-olefin/diene interpolymer is an ethylene/propylene/diene interpolymer. In a further embodiment, the diene is ENB.

In one embodiment, the ethylene/α-olefin/diene interpolymer has a density from 0.81 to 0.96 g/cc, preferably from 0.82 to 0.95 g/cc, and more preferably from 0.83 to 0.94 g/cc (1 cc=1 cm$^3$). All individual values and subranges from 0.81 to 0.96 g/cc are included herein and disclosed herein. In another embodiment, the ethylene/α-olefin/diene interpolymer has a density greater than, or equal to, 0.82 g/cc, preferably greater than, or equal to, 0.83 g/cc, and more preferably greater than, or equal to, 0.84 g/cc. In another embodiment, the ethylene/α-olefin/diene interpolymer has a density less than, or equal to, 0.96 g/cc, preferably less than, or equal to, 0.94 g/cc, and more preferably less than, or equal to, 0.93 g/cc. In a preferred embodiment, the ethylene/α-olefin/diene interpolymer is an ethylene/propylene/diene interpolymer. In a further embodiment, the diene is ENB.

In one embodiment, the ethylene/α-olefin/diene interpolymer has a Mooney viscosity, ML(1+4) at 125° C., greater than 15, preferably greater than 20, more preferably greater than 25, even more preferably greater than 30, and most preferably greater than 40. In another embodiment, the ethylene/α-olefin/diene interpolymer has a Mooney Viscosity, ML(1+4) at 125° C., less than 200, preferably less than 140, and more preferably less than 100. In a preferred embodiment, the ethylene/α-olefin/diene interpolymer polymer is an ethylene/propylene/diene interpolymer. In a further embodiment, the diene is ENB.

In one embodiment, at ethylene/α-olefin/diene interpolymer has a Mooney viscosity, ML(1+4) at 125° C., from 20 to 200, preferably from 25 to 140, and more preferably from 30 to 100. In a preferred embodiment, the ethylene/α-olefin/diene interpolymer is an ethylene/propylene/diene interpolymer. In a further embodiment, the diene is ENB.

In one embodiment, the ethylene/α-olefin/diene interpolymer has a number average molecular weight, (Mn) from 40,000 g/mole to 200,000 g/mole, more preferably from 50,000 g/mole to 150,000 g/mole, and most preferably from 60,000 g/mole to 100,000 g/mole. All individual values and subranges from 40,000 g/mole to 200,000 g/mole are included herein and disclosed herein. In a preferred embodiment, the ethylene/α-olefin/diene interpolymer is an ethylene/propylene/diene interpolymer. In a further embodiment, the diene is ENB.

In one embodiment, the ethylene/α-olefin/diene interpolymer has a weight average molecular weight, (Mw) from 80,000 g/mole to 500,000 g/mole, more preferably from 100,000 g/mole to 400,000 g/mole, and most preferably from 120,000 g/mole to 370,000 g/mole. All individual values and subranges from 80,000 g/mole to 500,000 g/mole are included herein and disclosed herein. In a preferred embodiment, the ethylene/α-olefin/diene interpolymer is an ethylene/propylene/diene interpolymer. In a further embodiment, the diene is ENB.

An ethylene/α-olefin/diene interpolymer may comprise a combination of two or more embodiments as described herein.

Isoprene Rubber

Isoprene rubbers (polyisoprenes) include both natural polyisoprene and synthetic polyisoprene. Suitable polyisoprenes include, but are not limited to, natural cis-1,4-polyisoprene (example, natural rubber), synthetic cis-1,4-polyisoprene, high vinyl 3,4-polyisoprene and 3,4-polyisoprene.

In one embodiment, the isoprene rubber has a Mooney Viscosity (ML 1+4 at 100° C.) greater than, or equal to, 20, preferably greater than, or equal to, 30, and more preferably greater than, or equal to 40.

In one embodiment, the isoprene rubber has a Mooney Viscosity (ML 1+4 at 100° C.) less than, or equal to, 100, preferably less than, or equal to, 80, and more preferably less than, or equal to 70.

In one embodiment, the isoprene rubber has a Mooney Viscosity (ML 1+4 at 100° C.) from 20 to 100, and preferably from 30 to 80, and more preferably from 40 to 70.

Suitable examples of isoprene rubbers include the following technical grades: SMR (Standard Malaysian Rubber), such as SMR 5 and SMR 20; TSR (Technical Specified Rubber) and RSS (Ribbed Smoked Sheets).

In one embodiment, the isoprene rubber is a natural cis-1,4-polyisoprene. In another embodiment, the isoprene rubber is a synthetic cis-1,4-polyisprene.

An isoprene rubber may have a combination of two or more embodiments as described herein.

Butadiene Rubber

Suitable butadiene rubbers (polybutadienes) include, but are not limited to, natural cis-1,4-polybutadiene, trans-1,4-polybutadiene, vinyl-1,2-polybutadiene, copolymers of styrene and butadiene, copolymers of isoprene and butadiene, and interpolymers of styrene, isoprene and butadiene.

In one embodiment, the butadiene rubber has a Mooney Viscosity (ML 1+4 at 100° C.) greater than, or equal to, 10, preferably greater than, or equal to, 15, and more preferably greater than, or equal to 20.

In one embodiment, the butadiene rubber has a Mooney Viscosity (ML 1+4 at 100° C.) less than, or equal to, 100, preferably less than, or equal to, 90, and more preferably less than, or equal to 80.

In one embodiment, the butadiene rubber has a Mooney Viscosity (ML 1+4 at 100° C.) from 10 to 100, preferably from 15 to 90, and more preferably from 20 to 80.

Examples of suitable butadiene rubbers include EUROPRENE NEOCIS BR rubbers, such as EUROPRENE NEOCIS BR 40 from Polimeri Europa; BUNA CB rubbers, such as BUNA CB 24 from Lanxess; and SE BR synthetic rubbers, such as SE BR-1220M from The Dow Chemical Company.

A butadiene rubber may have a combination of two or more embodiments as described herein.

Styrene Butadiene Rubber (SBR)

Suitable styrene butadiene rubbers include, but are not limited to, cold polymerized emulsion SBR and solution polymerized SBR.

In one embodiment, the styrene butadiene rubber has a Mooney Viscosity (ML 1+4 at 100° C.) greater than, or equal to, 10, preferably greater than, or equal to, 15, and more preferably greater than, or equal to 20.

In one embodiment, the styrene butadiene rubber has a Mooney Viscosity (ML 1+4 at 100° C.) less than, or equal to, 200, preferably less than, or equal to, 150, and more preferably less than, or equal to 100.

In one embodiment, the styrene butadiene rubber has a Mooney Viscosity (ML1+4 at 100° C.) from 10 to 200, preferably from 15 to 150, and more preferably from 20 to 100.

In one embodiment, the styrene butadiene rubber has a bound styrene content (ASTM D5775) from 5 to 80 percent, preferably from 10 to 70 percent, and more preferably from 15 to 60 percent, based on the total weight of polymerizable monomers.

In one embodiment, the styrene butadiene rubber has a bound styrene content (ASTM D5775) from 5 to 80 percent, preferably from 10 to 70 percent, and more preferably from 15 to 60 percent, based on the weight of the styrene butadiene rubber.

Examples of suitable styrene butadiene rubbers include BUNA SB rubbers, such as BUNA SB 1500-Schkopau; and SE SLR synthetic rubbers, such as SE SLR-4400 from The Dow Chemical Company.

A styrene butadiene rubber may have a combination of two or more embodiments as described herein.

Chloroprene Rubber

Suitable chloroprene rubbers (polychloroprenes) include, but are not limited to, homopolymers of chloroprene, sulfur-modified copolymers, and copolymers of chloroprene and 2,3-dichloro-1,3-butadiene.

In one embodiment, the chloroprene rubber has a Mooney Viscosity (ML 1+4 at 100° C.) greater than, or equal to, 10, preferably greater than, or equal to, 15, and more preferably greater than, or equal to 20.

In one embodiment, the chloroprene rubber has a Mooney Viscosity (ML 1+4 at 100° C.) less than, or equal to, 200, preferably less than, or equal to, 150, and more preferably less than, or equal to 125.

In one embodiment, the chloroprene rubber has a Mooney Viscosity (ML1+4 at 100° C.) from 10 to 200, preferably from 15 to 150, and more preferably from 20 to 125.

In another embodiment, the chloroprene rubber has a specific gravity (ASTM D792) from 1.20 to 1.25 g/cc.

Examples of suitable chloroprene rubbers include NEOPRENE polychloroprenes, such as NEOPRENE WRT from DuPont Performance Elastomers, and SKYPRENE chloroprene rubbers, such as SKYPRENE E-20 from TOSOH. (Neoprene is the product name and WRT is the grade)

A chloroprene rubber may have a combination of two or more embodiments as described herein.

Nitrite Rubber (NBR)

Suitable nitrile rubbers include, but are not limited to, copolymers of acrylonitrile and butadiene, hot or cold polymerized.

In one embodiment, the nitrile rubber has a Mooney Viscosity (ML 1+4 at 100° C.) greater than, or equal to, 15, preferably greater than, or equal to, 20, and more preferably greater than, or equal to 25.

In one embodiment, the nitrile rubber has a Mooney Viscosity (ML 1+4 at 100° C.) less than, or equal to, 150, preferably less than, or equal to, 140, and more preferably less than, or equal to 130.

In one embodiment, the nitrile rubber has a Mooney Viscosity (ML1+4 at 100° C.) from 15 to 150, preferably from 20 to 140, and more preferably from 25 to 130.

In one embodiment, the nitrile rubber has a bound acrylonitrile content (ASTM D 3533) from 20 to 80 weight percent, preferably from 25 to 70 weight percent, more preferably from 30 to 60 weight percent, based on total weight of polymerizable monomers.

In one embodiment, the nitrile rubber has a bound acrylonitrile content from 20 to 80 weight percent, preferably from 25 to 70 weight percent, more preferably from 30 to 60 weight percent, based on the weight of the nitrile rubber.

Examples of suitable nitrile rubbers include NITRIFLEX nitrile rubbers, such as Nitrile Rubber N-206 from NITRIFLEX.

A nitrile rubber may have a combination of two or more embodiments as described herein.

Hydrogenated Nitrite Rubber (HNBR)

In one embodiment, the hydrogenated nitrile rubber has a Mooney Viscosity (ML 1+4 at 100° C.) greater than, or equal to, 20, preferably greater than, or equal to, 30, and more preferably greater than, or equal to, 40.

In one embodiment, the hydrogenated nitrile rubber has a Mooney Viscosity (ML 1+4 at 100° C.) less than, or equal to, 120, preferably less than, or equal to, 110, and more preferably less than, or equal to 100.

In one embodiment, the hydrogenated nitrile rubber has a Mooney Viscosity (ML1+4 at 100° C.) from 20 to 120, preferably from 30 to 110, and more preferably from 40 to 100.

Examples of suitable hydrogenated nitrile rubbers include THERBAN hydrogenated nitrile rubbers, such as THERBAN C4367 from Lanxess.

A hydrogenated nitrile rubber may have a combination of two or more embodiments as described herein.

Chlorinated Polyethylene

In one embodiment, the chlorinated polyethylene has a Mooney Viscosity (ML 1+4 at 121° C.) greater than, or equal to, 30, preferably greater than, or equal to, 40, and more preferably greater than, or equal to, 50.

In one embodiment, the chlorinated polyethylene has a Mooney Viscosity (ML 1+4 at 121° C.) less than, or equal to, 130, preferably less than, or equal to, 120, and more preferably less than, or equal to 110.

In one embodiment, chlorinated polyethylene has a Mooney Viscosity (ML1+4 at 121° C.) from 30 to 130, preferably from 40 to 120, and more preferably from 50 to 110.

In another embodiment, chlorinated polyethylene has a specific gravity (ASTM D792) from 1.10 to 1.20 g/cc.

Examples of suitable chlorinated polyethylene include TYRIN chlorinated polyethylenes, such as TYRIN CM0136 from The Dow Chemical Company.

A chlorinated polyethylene may have a combination of two or more embodiments as described herein.

Chlorosulfonated Polyethylene

In one embodiment, the chlorosulfonated polyethylene has a Mooney Viscosity (ML 1+4 at 100° C.) greater than, or equal to, 10, preferably greater than, or equal to, 15, and more preferably greater than, or equal to, 20.

In one embodiment, the chlorosulfonated polyethylene has a Mooney Viscosity (ML 1+4 at 100° C.) less than, or equal to, 140, preferably less than, or equal to, 130, and more preferably less than, or equal to, 120.

In one embodiment, chlorosulfonated polyethylene has a Mooney Viscosity (ML1+4 at 100° C.) from 10 to 140, preferably from 15 to 130, and more preferably from 20 to 120.

In another embodiment, chlorosulfonated polyethylene has a specific gravity from 1.05 to 1.30 g/cc Examples of suitable chlorosulfonated polyethylenes include HYPALON chlorosulfonated polyethylenes, such as HYPALON 30 from Dupont Performance Elastomers; and TOSO CSM chlorosulfonated polyethylenes, such as TOSO-CSM TS-430 from TOSOH.

A chlorosulfonated polyethylene may have a combination of two or more embodiments as described herein.

Ethylene/Propylene Rubber

In one embodiment, the ethylene/propylene rubber has a Mooney Viscosity (ML 1+4 at 125° C.) greater than, or equal to, 10, preferably greater than, or equal to, 15, and more preferably greater than, or equal to 20.

In one embodiment, the ethylene/propylene rubber has a Mooney Viscosity (ML 1+4 at 125° C.) less than, or equal to, 200, preferably less than, or equal to, 150, and more preferably less than, or equal to 100.

In one embodiment, ethylene/propylene rubber has a Mooney Viscosity (ML1+4 at 125° C.) from 10 to 200, preferably from 15 to 150, and more preferably from 20 to 100.

Examples of suitable ethylene/propylene rubbers include VISTALON rubbers, such as VISTALON EPM 404 from ExxonMobil Chemical; and JSR EP rubbers, such as JSR EP 11 from JSR Corporation.

An ethylene/propylene rubber may have a combination of two or more embodiments as described herein.

Ethylene/α-Olefin Interpolymer

Suitable ethylene/α-olefin interpolymers include, but not limited to, copolymers of ethylene and butene, and copolymers of ethylene and octene.

In one embodiment, the ethylene/α-olefin interpolymer, and preferably an ethylene/α-olefin copolymer, has a density greater than, or equal to, 0.84 g/cc, preferably greater than, or equal to, 0.85 g/cc, and more preferably greater than, or equal to, 0.86 g/cc.

In one embodiment, the ethylene/α-olefin interpolymer, and preferably an ethylene/α-olefin copolymer, has a density less than, or equal to, 0.95 g/cc, preferably less than, or equal to, 0.93 g/cc, and more preferably less than, or equal to, 0.91 g/cc.

In one embodiment, ethylene/α-olefin interpolymer, and preferably an ethylene/α-olefin copolymer, has a density (ASTM D792) from 0.84 to 0.95, preferably from 0.85 to 0.93, and more preferably from 0.86 to 0.91.

In one embodiment, ethylene/α-olefin interpolymer, and preferably an ethylene/α-olefin copolymer, has a Mooney Viscosity (ML 1+4 at 121° C.) greater than, or equal to, 2, preferably greater than, or equal to, 5, and more preferably greater than, or equal to, 7.

In one embodiment, the ethylene/α-olefin interpolymer, and preferably an ethylene/α-olefin copolymer, has a Mooney Viscosity (ML 1+4 at 125° C.) less than, or equal to, 90, preferably less than, or equal to, 80, and more preferably less than, or equal to, 70.

Examples of suitable ethylene/α-olefin copolymers include ENGAGE polyolefin elastomers, such as ENGAGE 7387 and ENGAGE 8180, available from The Dow Chemical Company; and EXACT polymers available from ExxonMobil Chemical.

An ethylene/α-olefin interpolymer, and preferably an ethylene/α-olefin copolymer, may have a combination of two or more embodiments as described herein.

Ethylene/Diene Copolymer

Suitable ethylene/diene copolymers include copolymers of ethylene and nonconjugated or conjugated dienes.

In one embodiment, ethylene/diene copolymer has a Mooney Viscosity (ML 1+4 at 121° C.) greater than, or equal to, 2, preferably greater than, or equal to, 5, and more preferably greater than, or equal to, 7.

In one embodiment, the ethylene/diene copolymer has a Mooney Viscosity (ML 1+4 at 125° C.) less than, or equal to, 90, preferably less than, or equal to, 80, and more preferably less than, or equal to, 70.

In another embodiment, ethylene/diene copolymer has a Mooney Viscosity (ML1+4 at 121° C.) from 2 to 90, preferably from 5 to 80, and more preferably from 7 to, 70.

In one embodiment, the diene monomer is a non-conjugated diolefin. The nonconjugated diolefin can be a C6-C15 straight chain, branched chain or cyclic hydrocarbon diene. Illustrative nonconjugated dienes are straight chain acyclic dienes, such as 1,4-hexadiene and 1,5-heptadiene; branched chain acyclic dienes such as 5-methyl-1,4-hexadiene, 2-methyl-1,5-hexadiene, 6-methyl-1,5-heptadiene, 7-methyl-1,6-octadiene, 3,7-dimethyl-1,6-octadiene, 3,7-dimethyl-1,7-octadiene, 5,7-dimethyl-1,7-octadiene, 1,9-decadiene, and mixed isomers of dihydromyrcene; single ring alicyclic dienes such as 1,4-cyclohexadiene, 1,5-cyclooctadiene and 1,5-cyclododecadiene; multi-ring alicyclic fused and bridged ring dienes such as tetrahydroindene, methyl tetrahydroindene; alkenyl, alkylidene, cycloalkenyl and cycloalkylidene norbornenes such as 5-methylene-2-norbornene (MNB), 5-ethylidene-2-norbornene (ENB), 5-vinyl-2-norbornene, 5-propenyl-2-norbornene, 5-isopropylidene-2-norbornene, 5-(4-cyclopentenyl)-2-norbornene and 5-cyclohexylidene-2-norbornene. The diene is preferably a nonconjugated diene selected from the group consisting of ENB, dicyclopentadiene, 1,4-hexadiene, 7-methyl-1,6-octadiene, and preferably, ENB, dicyclopentadiene and 1,4-hexadiene, more preferably ENB and dicyclopentadiene, and even more preferably ENB.

In another embodiment, the diene is a conjugated diene. The conjugated diene may be selected from the group consisting of 1,3-pentadiene, 1,3-butadiene, 2-methyl-1,3-butadiene, 4-methyl-1,3-pentadiene, or 1,3-cyclopentadiene.

An ethylene/diene copolymer may have a combination of two or more embodiments as described herein.

Fluoro Rubber

Suitable fluoro rubbers include, but are not limited to, copolymers of perfluoro methylvinyl ether, vinylidene fluoride, and tetra-fluoroethylene, copolymers of ethylene, tetrafluoroethylene and perfluoromethylvinyl ether, copolymers of hexafluoro-propylene, vinylidene fluoride, and tetrafluoroethylene, and copolymers of hexafluoropropylene and vinylidene fluoride.

In one embodiment, the fluoro rubber has a Mooney Viscosity (ML 1+4 at 121° C.) greater than, or equal to, 10, preferably greater than, or equal to, 15, and more preferably greater than, or equal to 20.

In one embodiment, the fluoro rubber has a Mooney Viscosity (ML 1+4 at 121° C.) less than, or equal to, 170, preferably less than, or equal to, 160, and more preferably less than, or equal to 100.

In one embodiment, the fluoro rubber has a Mooney Viscosity (ML1+10 at 121° C.) from 10 to 170, preferably from 15 to 160, and more preferably from 20 to 100.

In another embodiment, the fluoro rubber has a specific gravity from 1.70 to 1.90 g/cc.

Examples of fluoro rubbers include VITON elastomers, such as VITON A-500 fluoroelastomer from DuPont Performance Elastomers.

A fluoro rubber may comprise a combination of two or more embodiments as described herein.

Polyurethane

In one embodiment, the polyurethane has a Mooney Viscosity (ML 5+4 at 100° C.) greater than, or equal to, 10, preferably greater than, or equal to, 15, and more preferably greater than, or equal to 20.

In one embodiment, the polyurethane has a Mooney Viscosity (ML 5+4 at 100° C.) less than, or equal to, 100, preferably less than, or equal to, 75, and more preferably less than, or equal to 60.

In one embodiment, polyurethane has a Mooney Viscosity (ML 5+4 at 100° C.) from 10 to 100, preferably from 15 to 75, and more preferably from 20 to 60.

Examples of suitable polyurethane rubber include UREPAN polyurethanes, such as UREPAN 640 G from Rhein Chemie.

In one embodiment, the polyurethane is a thermoplastic polyurethane.

In a preferred embodiment, the polyurethane is a crosslinkable polyurethane.

The polyurethane may comprise a combination of two or more embodiments as described herein.

Silicone Rubber

In one embodiment, the silicon rubber has a density greater than, or equal to, 1.02 g/cc, preferably greater than, or equal to, 1.04 g/cc, and more preferably greater than, or equal to, 1.06 g/cc.

In one embodiment, the silicon rubber as a density less than, or equal to, 1.25 g/cc, preferably less than, or equal to, 1.23 g/cc, and more preferably less than, or equal to, 1.22 g/cc.

In one embodiment, the silicone rubber has a density from 1.02 to 1.25 g/cc, preferably from 1.04 to 1.23 g/cc, and more preferably from 1.06 to 1.22 g/cc.

Examples of suitable silicone rubbers include SILASTIC silicone elastomers, such as SILASTIC Q7-4535 from Dow Corning.

Halobutyl Rubber

Suitable halobutyl rubbers include, but are not limited to, chlorobutyl and bromobutyl rubbers.

In one embodiment, the halobutyl rubber has a Mooney Viscosity (ML1+8 at 125° C.) greater than, or equal to, 20, preferably greater than, or equal to, 23, and more preferably greater than, or equal to, 25.

In one embodiment, the halobutyl rubber has a Mooney Viscosity (ML1+8 at 125° C.) less than, or equal to, 90, preferably less than, or equal to, 80, and more preferably less than, or equal to, 70.

In one embodiment, halobutyl rubber has a Mooney Viscosity (ML1+8 at 125° C.) from 20 to 90, preferably from 23 to 80, and more preferably from 25 to 70.

Examples of suitable halobutyl rubbers include EXXON bromobutyl rubbers, such as EXXON BROMOBUTYL 2255, and EXXON chlorobutyl rubbers, such as EXXON CHLOROBUTYL 1068, available from ExxonMobil Chemical.

Polyvinylidene Chloride

In one embodiment, polyvinylidene chloride has a DSC melting temperature from 130° C. to 190° C., preferably from 135° C. to 180° C., and more preferably from 140° C. to 175° C.

Examples of suitable polyvinylidene chlorides include SARAN resins, such as SARAN Resin 168 from The Dow Chemical Company.

Brominated Polymers Derived from a Copolymer of Isobutylene and p-Methyl Styrene In one embodiment, the brominated polymer has a Mooney Viscosity (ML1+8 at 125° C.) greater than, or equal to, 10, preferably greater than, or equal to, 15, and more preferably greater than, or equal to, 20.

In one embodiment, the brominated polymer has a Mooney Viscosity (ML1+8 at 125° C.) less than, or equal to, 80, preferably less than, or equal to, 70, and more preferably less than, or equal to 60.

In one embodiment, the brominated polymer has a Mooney Viscosity (ML1+8 at 125° C.) from 10 to 80, preferably from 15 to 70, and more preferably from 20 to 60.

Examples of suitable brominated polymers include EXXPRO elastomers, such as EXXPRO 3433 available from ExxonMobil Chemical.

Compositions

The compositions used to form the first layer and the second layer of an inventive article may each, independently, contain one or more additives, including, but not limited to, antioxidants, UV stabilizers, anti-ozonants, fillers, plasticizers, vulcanization accelerators, crosslinking agents, flame retardants, and processing aids.

Additional additives include, but are not limited to, lubricants; processing oils, antioxidants such as phenolics, secondary amines, phosphites and thioesters; fillers and reinforcing agents such as carbon black, glass, metal carbonates such as calcium carbonate, metal sulfates such as calcium sulfate, talc, clay or graphite fibers; hydrolytic stabilizers; lubricants such as fatty acids, fatty alcohols, esters, fatty amides, metallic stearates, paraffinic and microcrystalline waxes, silicones and orthophosphoric acid esters; acid neutralizers or halogen scavengers such as zinc oxide; mold release agents such as fine-particle or powdered solids, soaps, waxes, silicones, polyglycols and complex esters such as trimethylol propane tristearate or pentaerythritol tetrastearate; pigments, dyes and colorants; heat stabilizers such as organotin mercaptides, an octyl ester of thioglycolic acid and a barium or cadmium carboxylate; ultraviolet light stabilizers such as a hindered amine, an o-hydroxy-phenylbenzotriazole, a 2-hydroxy-4-alkoxybenzophenone, a salicylate, a cyanoacrylate, a nickel chelate and a benzylidene malonate and oxalanilide; acid-scavengers; and zeolites, molecular sieves and other known deodorizers. Other additives include scratch/mar additives, such as polydimethyl siloxane (PDMS) or functionalized polydimethyl siloxane or IRGASURF SR 100 (available from Ciba Specialty Chemicals) or scratch mar formulations containing erucamide.

Stabilizer and antioxidants may be added to a resin formulation to protect the resin from degradation, caused by reactions with oxygen, which are induced by such things as heat, light or residual catalyst from the raw materials. Antioxidants are commercially available from Ciba-Geigy, located in Hawthorn, N.Y., and include IRGANOX 565, 1010 and 1076, which are hindered phenolic antioxidants. These are primary antioxidants, which act as free radical scavengers, and may be used alone or in combination with other antioxidants, such as phosphite antioxidants, like IRGAFOS 168, available from Ciba-Geigy. Phosphite antioxidants are considered secondary antioxidants, are not generally used alone, and are primarily used as peroxide decomposers. Other available antioxidants include, but are not limited to, CYANOX LTDP, available from Cytec Industries in Stamford, Conn., and ETHANOX 1330, available from Albemarle Corp. in Baton Rouge, La. Many other antioxidants are available for use by themselves, or in combination with other such antioxidants.

Antioxidants and antiozonants additives include hindered phenols, bisphenols, and thiobisphenols; substituted hydroquinones; tris(alkylphenyl)phosphites; dialkylthiodipropionates; phenylnaphthylamines; substituted diphenylamines; dialkyl, alkyl aryl, and diaryl substituted p-phenylene diamines; monomeric and polymeric dihydroquinolines; 2-(4-hydroxy-3,5-t-butylaniline)-4,6-bis(octylthio)1,3,5-triazine, hexahydro-1,3,5-tris-β-(3,5-di-t-butyl-4-hydroxyphenyl)propionyl-s-triazine, 2,4,6-tris(n-1,4-dimethylpentylp-phenylenediamino)-1,3,5-triazine, tris-(3,5-di-t-butyl-4-hydroxybenzyl)isocyanurate, nickel dibutyldithiocarbamate, 2-mercaptotolylimidazole and its zinc salt, petroleum waxes, and the like.

In one embodiment, a composition further comprises the at least one filler selected from the group consisting of silica; carbon black; clay; titanium dioxide; silicates of aluminum, magnesium, calcium, sodium, potassium and mixtures thereof; carbonates of calcium, magnesium and mixtures thereof; oxides of silicon, calcium, zinc, iron, titanium, and aluminum; sulfates of calcium, barium, and lead; alumina trihydrate; magnesium hydroxide and mixtures thereof. In one embodiment, composition further comprises at least one filler. In a further embodiment, the at least one filler is carbon black.

In one embodiment, a composition, independently, further comprises at least one additive selected from the group consisting of pigment, antioxidants, flame retardants, scratch and mar resistant additives, and combinations thereof.

Other additives include, but are not limited to, one or more oils and one or more plasticizers. Plasticizers include, but are not limited to, petroleum oils such as ASTM D2226 aromatic oils; paraffinic and naphthenic oils; polyalkylbenzene oils; organic acid monoesters such as alkyl and alkoxyalkyl oleates and stearates; organic acid diesters such as dialkyl, dialkoxyalkyl, and alkyl aryl phthalates, terephthalates, sebacates, adipates, and glutarates; glycol diesters such as tri-, tetra-, and polyethylene glycol dialkanoates; trialkyl trimellitates; trialkyl, trialkoxyalkyl, alkyl diaryl, and triaryl phosphates; chlorinated paraffin oils; coumaroneindene resins; pine tars; vegetable oils such as castor, tall, rapeseed, and soybean oils and esters and epoxidized derivatives thereof; esters of dibasic acids (or their anhydrides) with monohydric alcohols such as o-phthalates, adipates and benzoates; and the like. Additional examples of suitable oils include those listed as ester plasticizers in Ellul, U.S. Pat. No. 6,326,426, which is incorporated herein. An artisan skilled in the processing of elastomers and rubber compositions will recognize which type of oil will be most beneficial. In one embodiment, a composition further comprises at least one oil or at least one plasticizer. In a further embodiment, the at least one oil or the at least one plasticizer is present in an amount less than 30 weight percent, based on the total weight of the composition.

In one embodiment, a composition contains flame retardant, such as a metal hydrate, such as aluminum trihydroxide, magnesium dihydroxide, or combinations thereof. A further description of such flame retardants is found in International Publication No. WO 2005/023924, fully incorporated herein by reference.

In one embodiment, a composition contains a flame retardant package that includes a halogenated alkane flame retardant, an aromatic halogenated flame retardant, and optionally a flame retardant synergist. In yet another embodiment, the flame retardant synergist comprises one or more of a metal oxide, halogenated paraffin, triphenylphosphate, dimethyldiphenylbutane, polycumyl, or a combination thereof. A further description of such flame retardants is found in International Publication No. WO 2002/12377, fully incorporated herein by reference.

A composition may also comprise an ethylene homopolymer or ethylene interpolymer grafted with maleic anhydride or succinic anhydride groups, and preferably the grafted ethylene homopolymer or interpolymer comprises less than 20 percent of said composition. In yet a further embodiment, the composition also includes at least one additive, such as a plasticizer, a pigment or colorant, a UV stabilizer, or a filler. Fillers may include calcined or uncalcined fillers. Suitable fillers include, but are not limited to calcium carbonate and wollastonite. Suitable components for scratch mar resistant formulations are described in more detail in U.S. Pat. No. 5,902,854, fully incorporated herein by reference.

In one embodiment, a composition comprises one or more crosslinking agents.

In one embodiment, at least one composition, independently, further comprises at least one crosslinking agent, one crosslinking activator in combination with a fatty acid and one crosslinking accelerator.

In one embodiment, the crosslinking agent is selected from the group consisting of sulfur-containing compounds, peroxides, and phenolic compounds.

Crosslinking agents include, but are not limited to, crosslinking materials or curatives which do not require the addition of a curing or crosslinking activator and accelerators. Crosslinking agents also include crosslinking materials or curatives which require the addition of a cure activator or crosslinking activator, mainly metal oxides, which include zinc oxide, hydrated lime, litharge, red lead, white lead, magnesium oxide, alkali carbonates, and hydroxides Zinc oxide is the most common, and it is generally used in combination with a fatty acid, such as stearic acid, to form a rubber soluble soap in the rubber matrix. Crosslinking agents also include crosslinking materials or curatives, which require the addition of a cure or one or more crosslinking accelerators. Examples of suitable cure or crosslinking accelerators include aniline, diphenylguanidine, hexmethylene tetramine, mercaptobenzothiazole and its zinc salt, benzothiazyl disulfide, 4,4'-dithiodimorpholine, zinc-0,0-dibutylphosphorodithioate, sulfenamides, thiurams, dithiocarbamates and xanthates. If a crosslinking agent is used, which requires the further addition of a crosslinking or cure activator, either the cure activator or the crosslinking agent, or both, can be encapsulated. Typically, when an encapsulated cure system is used, a crosslinking agent which requires the addition of a cure activator or crosslinking activator is used.

Any suitable crosslinking agent, or combination of crosslinking agents, may be used in the practice of this invention. Examples of suitable crosslinking agents are accelerated sulfur systems, including efficient and semi-efficient systems; peroxide systems, alone or with co-agents; phenolic resin curative systems; phenylenebismaleimide; urethane curatives; grafted alkoxysilanes; hydrosilylation curatives; and diamine curatives. In one embodiment, the crosslinking agent is selected from the group consisting of sulfur-containing compounds, peroxides, and phenolic compounds.

Crosslinking agents for use in the invention include sulfur-containing compounds such as elemental sulfur, 4,4'-dithiodimorpholine, thiuram di- and polysulfides, alkylphenol disulfides, and 2-morpholino-dithiobenzothiazole; peroxides such as di-tertbutyl peroxide, tertbutylcumyl peroxide, dicumyl peroxide, 2,5-dimethyl-2,5-di-(tertbutylperoxy) hexane, di-(tertbutylperoxyisopropyl) benzene, tertbutyl peroxybenzoate and 1,1-di-(tertbutylperoxy)-3,3,5-trimethylcyclohexane; metal oxides such as zinc, magnesium, and lead oxides; dinitroso compounds such as p-quinone dioxime and p,p'-dibenzoylquinone-dioxime; phenolic compounds; and phenol-formaldehyde resins containing hydroxymethyl or halomethyl functional groups. The suitability of any of these crosslinking agents for use in the invention will be largely governed by the choice of elastomers, as is well known to those skilled in the compounding art.

In one embodiment, sulfur containing compounds and the peroxides are the preferred crosslinking agents, and the sulfur containing compounds are most preferred. It is understood that mixtures of these crosslinking agents can be employed, though this is generally not preferred. The amount of the crosslinking agent can range from about 1 to 10 parts by weight based upon 100 parts of the elastomers in the composition. Sulfur can be a crystalline elemental sulfur or an amorphous elemental sulfur, and either type can be in pure form or supported on an inert carrier. An example of a supported sulfur is Rhenogran S-80 (80% S and 20% inert carrier) from Rhein Chemie.

Crosslinking temperatures and time employed are typical. Temperatures ranging from about 250° F. to about 440° F., and times ranging from about 1 minute to about 120 minutes may be employed.

An inventive composition may further comprise one or more thermoplastic polymers, including, but not limited to, homopolymers and interpolymers of ethylene, propylene, or other olefin-based polymers. Other blend components including other polyolefin materials (for example, EVA, LDPE, POP, POE) can be used to improve melt strength or modify properties. Ethylene-based interpolymers include copolymers or ethylene with butene, propylene, hexene, or octene. An inventive composition may also comprise one or more or more unsaturated diene elastomers (e.g., BR, SBR, NR and IR).

Ethylene-based polymers include copolymers or ethylene with butene, propylene, hexene, or octene. Suitable ethylene-based polymers include high density polyethylene (HDPE), low density polyethylene (LDPE), linear low density polyethylene (LLDPE), very low density polyethylene (VLDPE), ultra low density polyethylene (ULDPE), homogeneously branched linear ethylene/α-olefin interpolymers and homogeneously branched substantially linear ethylene/α-olefin interpolymers. In one embodiment, the ethylene-based polymer is an ethylene/α-olefin interpolymer. In a further embodiment, the α-olefin is selected from propylene, 1-butene, 1-hexene, or 1-octene.

In one embodiment, the first composition further comprises one or more other ethylene-based polymers or olefin-based polymers. In another embodiment, the first composition further comprises an ethylene-based polymer. In a further embodiment, the ethylene-based polymer is selected from an ethylene homopolymer or an ethylene/α-olefin interpolymer. In yet another embodiment, the first composition further comprises an ethylene/α-olefin interpolymer. In a further embodiment, the α-olefin is selected from propylene, 1-butene, 1-hexene, or 1-octene.

As discussed above, the terms "homogeneous" and "homogeneously-branched" are used in reference to ethylene/α-olefin interpolymers, in which the α-olefin comonomer is randomly distributed within a given polymer molecule, and all of the polymer molecules have the same or substantially the same ethylene-to-comonomer ratio.

The homogeneously branched ethylene interpolymers that can be used in the practice of this invention include homogeneously branched linear ethylene interpolymers, and homogeneously branched substantially linear ethylene interpolymers.

Included amongst the homogeneously branched linear ethylene interpolymers are ethylene polymers, which lack long chain branching (or measurable amounts of long chain branching, as determined, for example, by 13C NMR), but do have short chain branches, derived from the comonomer polymerized into the interpolymer, and which are homogeneously distributed, both within the same polymer chain, and between different polymer chains. That is, homogeneously branched linear ethylene interpolymers lack long chain branching, just as is the case for the linear low density polyethylene polymers or linear high density polyethylene polymers, and are made using uniform branching distribution polymerization processes, as described, for example, by Elston in U.S. Pat. No. 3,645,992. Commercial examples of homogeneously branched linear ethylene/α-olefin interpolymers include TAFMER polymers supplied by the Mitsui Chemical Company and EXACT polymers supplied by Exxon Chemical Company.

The homogeneously branched substantially linear ethylene interpolymers are described in U.S. Pat. Nos. 5,272,236; 5,278,272; 6,054,544; 6,335,410, and 6,723,810; the entire contents of each are herein incorporated by reference.

In addition, the substantially linear ethylene interpolymers are homogeneously branched ethylene polymers having long chain branching. The long chain branches have the same comonomer distribution as the polymer backbone, and can have about the same length as the length of the polymer backbone. The carbon length of a long chain branch is longer than the carbon length of a short chain branch formed from the incorporation of one comonomer into the polymer backbone.

Typically, "substantially linear" means that the bulk polymer is substituted, on average, with 0.01 long chain branches per 1000 carbons (including both backbone and branch carbons) to 3 long chain branches per 1000 carbons. Some polymers are substituted with 0.01 long chain branches per 1000 carbons, to 1 long chain branch per 1000 carbons, or from 0.05 long chain branches per 1000 carbons to 1 long chain branch per 1000 carbons, or from 0.3 long chain branches per 1000 carbons to 1 long chain branch per 1000 carbons.

Commercial examples of substantially linear interpolymers include the ENGAGE polymers (available from The Dow Chemical Company), and the AFFINITY polymers (available from The Dow Chemical Company).

The homogeneously branched linear or substantially linear ethylene interpolymers are characterized as having a narrow molecular weight distribution ($M_w/M_n$). For the linear and substantially linear ethylene polymers, the molecular weight distribution, $M_w/M_n$, is for example, less than or equal to 5, preferably less than or equal to 4, and more preferably from 1.5 to 4, and even more preferably from 1.5 to 3, and most preferably from 2.5 to 3.5. All individual values and subranges from 1 to 5 are included herein and disclosed herein.

The homogeneously branched substantially linear ethylene interpolymers used in a composition of the invention are known, and they and their method of preparation are described in, for example, U.S. Pat. Nos. 5,272,236; 5,278, 272 and 5,703,187; which are each incorporated in their entirety, herein, by reference.

The heterogeneously branched ethylene interpolymers can also be used in the present invention. Heterogeneously branched ethylene interpolymers include interpolymers of ethylene and one or more $C_3$ to $C_8$ α-olefins. Homopolymers of ethylene can also be prepared using the same catalysts that are used to prepare the heterogeneous systems, such as Ziegler-Natta catalysts. Both the molecular weight distribution, and the short chain branching distribution, arising from α-olefin copolymerization, are relatively broad compared to homogeneous linear ethylene polymers. Heterogeneously branched ethylene polymers can be made in a solution, slurry, or gas phase process using a Ziegler-Natta catalyst, and are well known to those skilled in the art. For example, see U.S. Pat. No. 4,339,507, the entire contents of which is incorporated herein by reference.

Heterogeneously branched ethylene-based interpolymers include, but are not limited to, linear medium density polyethylene (LMDPE), linear low density polyethylene (LLDPE), very low density polyethylene (VLDPE), and ultra low density polyethylene (ULDPE). Commercial polymers include DOWLEX polymers, ATTANE polymer, TUFLIN polymers, and FLEXOMER polymers (all from The DOW Chemical Company), and ESCORENE LLDPE polymers (from Exxon Mobil).

An ethylene-based polymer may have a combination of two or more embodiments as described herein.

Suitable propylene-based polymers include propylene homopolymers, propylene interpolymers, as well as reactor copolymers of polypropylene (RCPP), which can contain about 1 to about 20 weight percent ethylene or an α-olefin comonomer of 4 to 20 carbon atoms. The propylene interpolymer can be a random or block copolymer, or a propylene-based terpolymer.

Suitable propylene copolymers include propylene/ethylene, propylene/1-butene, propylene/1-hexene, propylene/4-methyl-1-pentene, propylene/1-octene, propylene/ethylene/1-butene, propylene/ethylene/ENB, propylene/ethylene/1-hexene, propylene/ethylene/1-octene, propylene/styrene, and propylene/ethylene/styrene.

Suitable polypropylenes are formed by means within the skill in the art, for example, using single site catalysts (metallocene or constrained geometry) or Ziegler Natta catalysts. The propylene and optional comonomers, such as ethylene or alpha-olefin monomers are polymerized under conditions within the skill in the art, for instance, as disclosed by Galli, et al., Angew. Macromol. Chem., Vol. 120, 73 (1984), or by E. P. Moore, et al. in Polypropylene Handbook, Hanser Publishers, New York, 1996, particularly pages 11-98. Polypropylene polymers include Shell's KF 6100 homopolymer polypropylene; Solvay's KS 4005 polypropylene copolymer; Solvay's KS 300 polypropylene terpolymer; and INSPIRE polypropylene resins available from The Dow Chemical Company.

Suitable propylene/α-olefin polymers, containing at least 50 mole percent polymerized propylene, fall within the invention. Suitable polypropylene base polymers include VERSIFY polymers (The Dow Chemical Company) and VISTAMAXX polymers (ExxonMobil Chemical Co.), LICOCENE polymers (Clariant), EASTOFLEX polymers (Eastman Chemical Co.), REXTAC polymers (Hunstman), and VESTOPLAST polymers (Degussa). Other suitable polymers include propylene-α-olefins block copolymers and interpolymers, and other propylene based block copolymers and interpolymers known in the art. Additional propylene-based interpolymers include those described in U.S. Provisional Application No. 60/988,999 (filed Nov. 19, 2007), fully incorporated herein.

Preferred comonomers include, but are not limited to, ethylene, isobutylene, 1-butene, 1-pentene, 1-hexene, 3-methyl-1-pentene, 4-methyl-1-pentene, 1-octene, non-conjugated dienes, polyenes, butadienes, isoprenes, pentadienes, hexadienes (for example, 1,4-hexadiene), octadienes, styrene, halo-substituted styrene, alkyl-substituted styrene, tetrafluoroethylenes, vinylbenzocyclobutene, naphthenics, cycloalkenes (for example, cyclopentene, cyclohexene, cyclooctene), and mixtures thereof. Typically and preferably, the comonomer is a C2 or a C4-C20α-olefin. Preferred comonomers include ethylene, 1-butene, 1-pentene, 1-hexene, 1-heptene and 1-octene, and more preferably include ethylene, 1-butene, 1-hexene and 1-octene.

In another embodiment, the propylene-based polymer is a propylene/α-olefin interpolymer or a propylene/ethylene interpolymer, which each has a molecular weight distribution less than, or equal to, 5, and preferably less than, or equal to, 4, and more preferably less than, or equal to 3. More preferably the propylene/α-olefin interpolymer has a molecular weight distribution from 1.1 to 5, and more preferably from 1.1 to 4, and more preferably from 1.1 to 3.

A composition may also contain a functionalized polymer, including, but not limited to, functional grades of polyethylenes, such as maleic acid esters, acrylic and methacrylic acid esters; acrylonitrile; vinyl acetate; and derivatives such as chlorinated and sulfonated polyethylenes and copolymers; ionomers; polyvinyl chlorides and their related copolymers, functional and modified grades; polymers of acetal and their related copolymers and modified grades; fluorinated olefin polymers; polyvinylidene fluoride; polyvinyl fluoride; polyamides and their modified grades; polyimides; polyarylates; polycarbonates and their related copolymers and modified grades; polyethers; polyethersulfones; polyarylsulphones; polyketones; polyetherimides; poly(4-methyl-1-pentene); polyphenylenes and modified grades; polysulphones; polyurethanes and their related modified grades; polyesters and their related modified grades; polystyrene and their related copolymers and modified grades; polybutylene; polymers of acrylo-nitrile, polyacrylates, mixtures thereof, and the like.

A composition may comprise a combination of two or more embodiments as described herein.

Process for Forming Articles

Inventive articles can be produced by processes known in the art, including, but not limited to, a coextrusion process, a compression molding process, a casting process, or a lamination process. Blended compositions can be produced using known methods, such as dry blending, or melt mixing, including compounding via banbury, intermix, dispersion kneader, brabender, Haake mixer, twin screw, single screw extrusion.

An article of the invention may be prepared by selecting the polymer compositions suitable for each layer; forming each layer, and bonding the layers, or coextruding, compression molding, laminating, or casting one or more layers. Desirably, the article layers are bonded continuously over the interfacial area between layers.

In one embodiment, the article is formed by a coextrusion process. In a further embodiment, the article is formed by coextruding the first layer and the second layer to form a two-layered film.

In one embodiment, the article is formed by a compression molding process. In a further embodiment, the article is formed by compression molding a film formed from the first composition and a film formed from the second composition to form a two-layered film.

In one embodiment, the article is formed by a casting process.

In one embodiment, the article is formed by a lamination process.

For each layer, typically, it is suitable to melt mix the components of the respective compositions and any additional additives. The melt mixing should be carried out in a manner, such that an adequate degree of dispersion is achieved. The parameters of melt mixing will necessarily vary depending upon the components. However, typically, the total polymer deformation, that is, mixing degree, is important, and is controlled by, for example, the rotor-design and the melt temperature. The melt temperature during article forming will depend on the article components. Typically, after melt mixing, a article is formed by coextruding, compression molding, laminating, or casting one or more layers.

In one embodiment, sheets of the article composition can be bonded by heat sealing or by use of an adhesive. Heat sealing can be effected using conventional techniques, including, but not limited to, a hot bar, impulse heating, side welding, ultrasonic welding, or other alternative heating mechanisms as discussed above.

The article compositions of the aforementioned processes may be made to any thickness depending upon the application. In one embodiment, the multilayered articles have a thickness less than, or equal to 3500 microns, preferably less than, or equal to, 3000 microns, and more preferably less than, or equal to 2600 microns. In one embodiment, the articles have a total thickness of from 50 to 3500 microns, preferably from 100 to 3000 microns, more preferably from 200 to 2600 microns. The permeability of the article may also be adjusted depending upon the application.

Applications

The invention also provides a variety of parts, comprising at least one component formed from an inventive article. Such parts include, but are not limited to, belts, hoses, tubes, gaskets, membranes, molded goods, extruded parts, automotive parts, adhesives, inner tubes, engine mounts, tires and tire sidewalls.

Parts can be prepared by injection molding, extrusion, extrusion followed by either male or female thermoforming, low pressure molding, compression molding and the like.

The invention provides a tire comprising an inventive article.

The invention provides an inner tube comprising an inventive article. In a further embodiment, the inner tube is a tire inner tube The invention provides a hose comprising an inventive article.

The invention provides a belt comprising an inventive article.

The invention provides a tube comprising an inventive article.

The invention provides an automotive part comprising an inventive article.

The invention provides an automotive weather strip comprising an inventive article.

The invention provides a vibration damper comprising an inventive article.

The invention provides an extruded profile comprising an inventive article.

The invention provides a building or construction material comprising an inventive article.

The invention provides a shoe component comprising an inventive article.

The invention provides a wire insulation or a cable insulation comprising an inventive article.

The invention provides a wire jacket or a cable jacket comprising an inventive article.

As discussed above, the multi-layer articles of the invention can be produced via coextrusion, compression molding, lamination, casting, and the like, and can be used for numerous bladder applications including cushioning articles, equine cushions, bra pads, sportsballs, and the like.

Additional articles include, but are not limited to, polymer sheets, foams, coatings, computer parts, building materials, household appliances, electrical supply housings, lawn furniture strips or webbing, lawn mower, garden hose, refrigerator gaskets, acoustic systems, utility cart parts, desk edging, toys and water craft parts. The structures can be used in roofing applications such as roofing membranes. The structures can further be used in fabricating components of footwear such as a shaft for a boot, particularly an industrial work boot. A skilled artisan can readily augment this list without undue experimentation.

DEFINITIONS

Any numerical range recited herein, include all values from the lower value to the upper value, in increments of one unit, provided that there is a separation of at least 2 units between any lower value and any higher value. As an example, if it is stated that the amount of a component, or a value of a compositional or physical property, such as, for example, amount of a blend component, melting temperature, melt index, etc., is between 1 and 100, it is intended that all individual values, such as, 1, 2, 3, etc., and all subranges, such as, 1 to 20, 55 to 70, 197 to 100, etc., are expressly enumerated in this specification. For values which are less than one, one unit is considered to be 0.0001, 0.001, 0.01 or 0.1, as appropriate. These are only examples of what is specifically intended, and all possible combinations of numerical values between the lowest value and the highest value enumerated, are to be considered to be expressly stated in this application. Numerical ranges have been recited, as discussed herein, in reference to structure thickness, Mooney Viscosity, density, and other properties.

The term "multilayered article," as used herein, refers to an article that comprises a structure with more than one layer or ply.

The term "multilayered film," as used herein, refers to a structure with more than one layer or ply.

The term "composition," as used herein, includes a mixture of materials which comprise the composition, as well as reaction products and decomposition products formed from the materials of the composition.

The term "polymer," as used herein, refers to a polymeric compound prepared by polymerizing monomers, whether of the same or a different type. The generic term polymer thus embraces the term homopolymer, employed to refer to polymers prepared from only one type of monomer, and the term interpolymer as defined hereinafter.

The term "interpolymer," as used herein, refers to polymers prepared by the polymerization of at least two different types of monomers. The generic term interpolymer thus includes copolymers, employed to refer to polymers prepared from two different types of monomers, and polymers prepared from more than two different types of monomers.

The term "thermoplastic polymer" or "thermoplastic composition" and similar terms, mean a polymer or polymer composition that is substantially thermally extrudable or deformable, albeit relatively aggressive conditions may be required.

The terms "blend" or "polymer blend," as used herein, mean a blend of two or more polymers. Such a blend may or may not be miscible (not phase separated at molecular level). Such a blend may or may not be phase separated. Such a blend may or may not contain one or more domain configurations, as determined from transmission electron spectroscopy, light scattering, x-ray scattering, and other methods known in the art.

The term, "olefin-based polymer," as used herein, refers to a polymer that contains a majority weight percent polymerized olefin monomers (for example ethylene or propylene), based on the weight of the polymer.

The term, "ethylene-based polymer," as used herein, refers to a polymer that contains a majority weight percent polymerized ethylene monomers, based on the weight of the polymer.

The term, "propylene-based polymer," as used herein, refers to a polymer that contains a majority weight percent polymerized propylene monomers, based on the weight of the polymer.

The terms "comprising", "including", "having" and their derivatives are not intended to exclude the presence of any additional component, step or procedure, whether or not the same is specifically disclosed. In order to avoid any doubt, all compositions claimed through use of the term "comprising" may include any additional additive, adjuvant, or compound whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

Test Procedures

Mooney Viscosity

The Mooney Viscosity is measured in accordance with ASTM D1646-06 (Alpha Technologies Rheometer MV 2000) using the test temperature, rotor size, and test times specified for each type of polymer.

For a carbon black coated ethylene/α-olefin interpolymer (preferably an EPDM) interpolymer, the polymer Mooney Viscosity [MV (ML1+4 at 125° C.)] for the interpolymer (no carbon black and no oil) can be determined, by one skilled in the art, by one of two methods as described below. The following methods are in reference to carbon black coated interpolymers, however, one skilled in the art could use similar methods for other types of fillers, or other types of polymer/filer morphologies, such as filler dispersed within an abraded, or grated, polymer bale. The following methods could also be modified by one skilled in the art to provide for the determination of Mooney Viscosity at other temperatures and/or other test conditions, such as preheat time and/or rotor size. The instrument is an Alpha Technologies Rheometer MV 2000. "Polymer Mooney Viscosity" refers to the Mooney Viscosity of the interpolymer without any filler (carbon black) and without any oil.

Method 1

For a carbon black coated interpolymer, with no oil or a known amount of oil, typically less than 2 weight percent oil (known amount, and based on the weight of the interpolymer) (INT A), and which has a measured viscosity less than 100 [MV (ML1+4 at 125° C.)] as determined by ASTM D1646-06 (Alpha Technologies Rheometer MV 2000), the polymer Mooney viscosity of the interpolymer can be determined from a calibration curve as follows. The amount of carbon black in the polymerized interpolymer (INT A) can be determined gravimetrically by selective ashing of the polymer in a manner to leave the carbon black intact (for example TGA).

An interpolymer (no filler, no oil), corresponding in chemical make-up to the interpolymer of interest, and prepared from the same or similar catalyst system, and of known polymer Mooney Viscosity [MV (ML1+4 at 125° C.)], is melt blended with various levels of carbon black, and the required amount of oil, to form a range of carbon black filled interpolymers. Melt blending can be done in a Brabender mixer. The carbon black and oil used, is the same as that in the interpolymer of interest (INT A). The Mooney viscosity [MV (ML1+4 at 125° C.)] is measured for each sample (ASTM D1646-06, Alpha Technologies Rheometer MV 2000), and a calibration curve is generated, showing the measured Mooney Viscosity as a function of amount of carbon black. A series of such calibration curves are generated for several interpolymers (no filler, no oil) of varying viscosities. The data from the generated calibration curves are entered into a regression program, such as a MICROSOFT EXCEL regression program, and the following information is generated: a coefficient for the carbon black level, a coefficient for the measured Mooney viscosity, and an intercept.

The polymer Mooney Viscosity [MV (ML1+4 at 125° C.)] of the interpolymer (INT A) can be calculated using the data generated from the regression analysis, the known level of carbon black in the interpolymer (INTA), and the measured Mooney viscosity [MV (ML1+4 at 125° C.)] of the interpolymer (INT A).

Method 2

For a carbon black coated interpolymer, with no oil or a known amount of oil, typically less than 2 weight percent oil (known amount and based on the weight of the interpolymer) (INT B), and which has a measured viscosity greater than, or equal to, 100 [MV (ML1+4 at 125° C.)], as determined by ASTM D1646-06 (Alpha Technologies Rheometer MV 2000), the polymer Mooney viscosity can be determined from a calibration curve as follows. The amount of carbon black in the polymerized INT B interpolymer can be determined gravimetrically by selective ashing of the polymer in a manner to leave the carbon black intact (for example, TGA).

An interpolymer (no filler, no oil), for use in calibration, and corresponding in chemical make-up to the interpolymer of interest, and prepared from the same or similar catalyst system, and of known polymer Mooney Viscosity, is melt blended with a fixed amount of carbon black (for example, from 40 to 60 phr carbon black, based on hundred parts interpolymer), and a fixed amount of an oil (for example, from 60 to 80 phr oil, based on hundred parts interpolymer) to form a first sample. The carbon black and oil is the same type as that in the interpolymer of interest (INTB). The amount of carbon black and the amount of oil are each greater than the respective amounts in the interpolymer of interest (INTB). Additional samples are formed, each having an interpolymer of different Mooney viscosity, and each having the same amount and type of both carbon black and oil as the above interpolymer used for calibration.

The Mooney viscosity [MV (ML1+4 at 125° C.)] is measured for each sample (ASTM D1646-06 (Alpha Technologies Rheometer MV 2000)). A calibration curve is generated, showing the measured Mooney viscosity [MV (ML1+4 at 125° C.)] as a function of the polymer Mooney Viscosity [MV (ML1+4 at 125° C.)] of the interpolymer.

The carbon-black coated interpolymer (INT B) of interest is next compounded with additional carbon black to achieve a final carbon black level, as that used in the samples for calibration, as discussed above. Also the INT B interpolymer is compounded with additional oil to achieve the same oil level, as that used in the samples for calibration as discussed above, to form a "modified INT B" interpolymer. The Mooney viscosity [MV (ML1+4 at 125° C.)] of the modified INT B interpolymer is measured. The polymer Mooney Viscosity of the interpolymer can be then calculated using the calibration curve as described above.

Oxygen Transmission Rate (OTR)

The Oxygen Transmission Rate (OTR) is measured using Oxygen Permeation Analyzer (Illinois Instruments, Model No. 8000). This instrument conforms to ASTM F 1307. The cover was removed from both the test chambers by loosening the three knobs, anti-clockwise, and any residual sealant from the bottom half of the chamber was removed. A thin layer of sealant was added to the rim. A template was used to cut out the sample film for analysis. The sample film was placed onto the chamber bottom, and the edges of the film were smoothed, in order to remove any air pockets. The chamber cover was placed back and the three knobs were tightened.

From the main screen, the screen tabs were selected as follows.

"Test Tab" was checked.
"Set Up and Purge Tab" was checked.
"Include Box Tab" both were checked.
"Purge Enabled Tab" was checked.
"Time Test Box" was unchecked.

The sampling rate was selected to ten minutes. The bypass time and purge level were set according to Table A below.

TABLE A

| STRUCTURE | Bypass Time (mins) | Purge Level (cc/100 in$^2$/day) |
|---|---|---|
| Low Barrier (OTR values greater than 30 cc/100 in$^2$/day) | 10 | 10 |
| High Barrier (OTR values less than 30 cc/100 in$^2$/day) | 30 | 1 |

After starting the test, the Purge Monitor area indicated the status of the bypass and purge routine. The test began when both the pipes and cells were purged (turned green). Oxygen flowed to the top chamber, and nitrogen flowed to the bottom chamber. The test ended by manually clicking the "stop button," when the OTR readings stabilized, and the corresponding graphed profile reached a plateau.

The densities of the ethylene homopolymers and ethylene-based interpolymers, other olefin-based polymers, and other polymers as noted in the standard, are measured in accordance with ASTM D-792-00.

Melt index ($I_2$) of ethylene homopolymers and ethylene-based interpolymers are measured in accordance with ASTM D-1238-04, condition 190° C./2.16 kg. The melt flow rate (MFR) of propylene homopolymers and propylene-based interpolymers are measured in accordance with ASTM D-1238-04, condition 230° C./2.16 kg.

The average molecular weights and molecular weight distributions for ethylene-base polymers can be determined with a chromatographic system consisting of either a Polymer Laboratories Model PL-210 or a Polymer Laboratories Model PL-220. The column and carousel compartments are operated at 140° C. for ethylene-based polymers. The columns are three Polymer Laboratories 10-micron Mixed-B columns. The solvent is 1,2,4 trichlorobenzene. The samples are prepared at a concentration of 0.1 gram of polymer in 50 milliliters of solvent. The solvent used to prepare the samples contains 200 ppm of butylated hydroxytoluene (BHT). Samples are prepared by agitating lightly for two hours at 160° C. The injection volume is 100 microliters, and the flow rate is 1.0 milliliters/minute. Calibration of the GPC column set is performed with narrow molecular weight distribution polystyrene standards, purchased from Polymer Laboratories (UK). The polystyrene standard peak molecular weights are converted to polyethylene molecular weights using the following equation (as described in Williams and Ward, J. Polym. Sci., Polym. Let., 6, 621 (1968)):

$$M\text{polyethylene} = A \times (M\text{polystyrene})^B,$$

where M is the molecular weight, A has a value of 0.4315 and B is equal to 1.0.

Polyethylene equivalent molecular weight calculations are performed using Viscotek TriSEC software, Version 3.0. The molecular weights for propylene-based polymers can be determined using Mark-Houwink ratios according to ASTM D6474.9714-1, where, for polystyrene, a=0.702 and log K=−3.9, and for polypropylene, a=0.725 and log K=−3.721. For propylene-based samples, the column and carousel compartments are operated at 160° C.

Percent crystallinity for ethylene-based and propylene-based polymers can be determined by differential scanning calorimetry (DSC), using a TA Instruments Model Q1000 Differential Scanning calorimeter. A sample of around five to eight mg is cut from the material to be tested, and placed directly in the DSC pan for analysis. The sample is first heated at a rate of about 10° C./min to 180° C. for ethylene-based polymers (230° C. for propylene-based polymers), and held isothermally for three minutes, at that temperature, to ensure complete melting (the first heat). Then the sample is cooled at a rate of 10° C. per minute to −60° C. for ethylene-based polymers (−40° C. for propylene-based polymers), and held there isothermally for three minutes. Next, the sample is again heated (the second heat) at a rate of 10° C. per minute, until complete melting. The thermogram from this second heat is referred to as the "second heat curve." Thermograms are plotted as watts/gram versus temperature.

The percent crystallinity in the ethylene-based polymers may be calculated using heat of fusion data, generated in the second heat curve (the heat of fusion is normally computed automatically by typical commercial DSC equipment, by integration of the relevant area under the heat curve). The equation for ethylene-based samples is:
% Cryst. $=(H_f \div 292 \text{ J/g}) \times 100$; and the equation for propylene-based samples is: % Cryst. $=(H_f \div 165 \text{ J/g}) \times 100$. The "% Cryst." represents the percent crystallinity and "$H_f$" represents the heat of fusion of the polymer in Joules per gram (J/g).

The melting point(s) ($T_m$) of the polymers can be determined from the second heat curve obtained from DSC, as described above. The crystallization temperature ($T_c$) can be determined from the first cooling curve.

The structures and processes of this invention, and their use, are more fully described by the following examples. The following examples are provided for the purpose of illustrating the invention, and are not to be construed as limiting the scope of the invention.

EXPERIMENTAL

Resins

EPDM=NORDEL IP 3640 (Mooney viscosity, ML1+4@ 125° C. (MU)=36-44;

Ethylene, Mass %=53-57; ENB, Mass %=1.4-2.2; Molecular Weight Distribution=Medium)

Butyl rubber=Lanxess BUTYL 301 (Mooney Viscosity, ML1+8@125° C. (MU)=51+/−5; Unsaturation, mol %=1.85+/−0.20)

These polymer resins typically contain one or more stabilizers.

Representative Procedure—Compression Molded Structures

The individual resins (EPDM and butyl rubber) were each compression molded, at 180° C., for two minutes (64 to 74 MPa), in a Carver Compression Molding Machine (MODEL NO. 4394.4PR3400) to form a film. Each film was then cooled at 23° C., for 24 hours. The films (EPDM film and butyl rubber film) were combined, face to face, and manually compressed using a "2 kg roller," for 30 seconds, to form a single, two-layered film.

A "monolayer" film (Comparative Example 1 and 2) was produced by blending the EPDM and butyl rubber resins in a Haake mixer at 80° C., for 5 minutes, to form a blended material. The blended material was compression molded at 180° C., for two minutes (64 to 74 MPa).

Each film (Examples 1 to 4 and Comparative Examples 1 and 2) was placed into an Oxygen Permeation Analyzer (Illinois Instruments, Model No. 8000), and analyzed for oxygen bather performance, as determined by Oxygen Transmission Rate (OTR). Oxygen Transmission Rate was measured at 23° C. and 0% relative humidity. The results are shown in Table 1 and 2 below.

TABLE 1

| OTR Results - Comparison between Monolayer and Two-layered Film | | |
|---|---|---|
| | Example 1 | Comparative Example 1 |
| Film composition | 56.4% (EPDM) 43.6% (Butyl*) (% based on layer ratio) | 56 wt % EPDM/ 44 wt % Butyl* (wt % based on total weight of film) |
| Film type | Two-layered First layer = EPDM Second layer = Butyl* | Monolayer |
| Film Thickness (μm) | 390 | 390 |
| Layer Ratio (μm EPDM/μm Butyl) | 220/170 | N/A |
| OTR (cc/m²/day at ambient atm.) Mean ± SD (n = 2) | 571 ± 1 | 1566 ± 204 |

*Butyl = butyl rubber
N/A = Not Applicable

TABLE 2

OTR Results - Comparison between Monolayer Incumbent and Two-layered Inventive Films to determine the Optimum Level of EDPM/Butyl for Two-layered Film

| | Example | | | |
|---|---|---|---|---|
| | Comp. Ex. 2 | Example 2 | Example 3 | Example 4 |
| Film composition | 25 wt % (EPDM) 75 wt % (Butyl*) (wt % based on total weight of film) | 25.6% (EPDM) 74.4% (Butyl*) (% based on film thickness ratio) | 38.5% (EPDM) 61.5% (Butyl*) (% based on film thickness ratio) | 48.7% (EPDM) 51.3% (Butyl*) (% based on film thickness ratio) |
| Film Type | Monolayer | Two-layered | Two-layered | Two-layered |
| Film Thickness (μm) | 390 | 390 | 390 | 390 |
| Layer Ratio (μm EPDM/μm Butyl) | N/A | 100/290 | 150/240 | 190/200 |
| OTR (cc/m$^2$/day at ambient atm.) Mean ± SD (n = 2) | 465 ± 77 | 319 ± 4 | 406 ± 35 | 414 ± 30 |

*Butyl = butyl rubber
N/A = Not Applicable

As shown in Table 1 and Table 2, the Oxygen Transmission Rate (OTR) results demonstrate that the multilayer films, based on a layer of EPDM and a layer of butyl rubber, show a much better (lower) oxygen transmission rate than the monolayer films formed from a blend of the EPDM and butyl rubber.

The results demonstrate that an increased level of EPDM can still be used in conjunction with butyl rubber, provided a two-layered film, such as one formed by a coextrusion construction, is used to make the final film. The higher level of EPDM in a blend with butyl rubber usually decreases barrier properties of the sheet. However, the inventive examples have demonstrated that the two-layered films, with a layer of EPDM and a layer of the butyl rubber, afford increased barrier properties, which will translate to improved gas retention in applications, such as an inner tube for tires. The concept of the invention can also be applied to multilayered films containing more than two layers (or plies). Multilayered films can be formed by several processes, including compression molding, coextrusion, lamination, and cast film processes.

Although the invention has been described in certain detail through the preceding specific embodiments, this detail is for the primary purpose of illustration. Many variations and modifications can be made by one skilled in the art, without departing from the spirit and scope of the invention, as described in the following claims.

The invention claimed is:

1. A tire comprising an article comprising a first layer and a second layer, and
    wherein the first layer is formed from a first composition consisting of an ethylene/α-olefin/diene interpolymer, an isoprene rubber (synthetic), a butadiene rubber, a styrene butadiene rubber, a chloroprene rubber, a nitrile rubber, a hydrogenated nitrile rubber, a chlorinated polyethylene, a chlorosulfonated polyethylene, an ethylene/propylene rubber, an ethylene/diene copolymer, a fluoro rubber, a polyurethane, a silicone rubber, or a combination thereof, and one or more additives selected from antioxidants, UV stabilizers, anti-ozonants, fillers, plasticizers, vulcanization accelerators, crosslinking agents, flame retardants, and processing aids; and
    wherein the second layer is formed from a second composition consisting of a butyl rubber, a halobutyl rubber, polyvinylidene chloride, a brominated polymer derived from a copolymer of isobutylene and p-methyl styrene, a nitrile rubber, a chloroprene rubber, a chlorosulfonated polyethylene, a chlorinated polyethylene, a polyurethane, a fluoro rubber, or a combination thereof, and one or more additives selected from antioxidants, UV stabilizers, anti-ozonants, fillers, plasticizers, vulcanization accelerators, crosslinking agents, flame retardants, and processing aids; and
    wherein the second layer is adjacent to the first layer.

2. The article of claim 1, wherein the first composition is different from the second composition.

3. The article of claim 1, wherein the second layer is formed with a second composition consisting of a butyl rubber, a halobutyl rubber, a polyvinylidene chloride, a brominated polymer derived from a copolymer of isobutylene and p-methyl styrene, a nitrile rubber, or a combination thereof.

4. The article of claim 1, wherein the second composition consists of a butyl rubber, a halobutyl rubber, a polyvinylidene chloride, a nitrile rubber, or a combination thereof.

5. The article of claim 1, wherein the second composition consists of a butyl rubber, a polyvinylidene chloride, or a combination thereof.

6. The article of claim 1, wherein the second composition consists of a butyl rubber.

7. The article of claim 1, wherein the first composition consists of an ethylene/α-olefin/diene interpolymer, an isoprene rubber (synthetic), a butadiene rubber, a styrene butadiene rubber, an ethylene/propylene rubber, an ethylene/diene copolymer, a silicone rubber, or a combination thereof.

8. The article of claim 1, wherein the first composition consists of an ethylene/α-olefin/diene interpolymer, a natural rubber, a butadiene rubber, a styrene butadiene rubber, or a combination thereof.

9. The article of claim 1, wherein the first composition consists of an ethylene/α-olefin/diene interpolymer.

10. An inner tube comprising an article comprising a first layer and a second layer, and
    wherein the first layer is formed from a first composition consisting of an ethylene/α-olefin/diene interpolymer, an isoprene rubber (synthetic), a butadiene rubber, a styrene butadiene rubber, a chloroprene rubber, a nitrile rubber, a hydrogenated nitrile rubber, a chlorinated polyethylene, a chlorosulfonated polyethylene, an ethylene/propylene rubber, an ethylene/diene copolymer, a fluoro rubber, a polyurethane, a silicone rubber, or a combination thereof, and one or more additives selected from antioxidants, UV stabilizers, anti-ozonants, fillers, plasticizers, vulcanization accelerators, crosslinking agents, flame retardants, and processing aids; and wherein the second layer is formed from a second composition consisting of a butyl rubber, a halobutyl rubber, polyvinylidene chloride, a brominated polymer derived from a copolymer of isobutylene and p-methyl styrene, a nitrile rubber, a chloroprene rubber, a chlorosulfonated polyethylene, a chlorinated polyethylene, a polyurethane, a fluoro rubber, or a combination thereof, and one or more additives selected from antioxidants, UV stabilizers, anti-ozonants, fillers, plasticizers, vulcanization accelerators, crosslinking agents, flame retardants, and processing aids, and wherein the second layer is adjacent to the first layer.

11. The article of claim 10, wherein the first composition is different from the second composition.

12. The article of claim 10, wherein the second layer is formed with a second composition consisting of a butyl rubber, a halobutyl rubber, a polyvinylidene chloride, a brominated polymer derived from a copolymer of isobutylene and p-methyl styrene, a nitrile rubber, or a combination thereof.

13. The article of claim 10, wherein the second composition consists of a butyl rubber, a halobutyl rubber, a polyvinylidene chloride, a nitrile rubber, or a combination thereof.

14. The article of claim 10, wherein the second composition consists of a butyl rubber, a polyvinylidene chloride, or a combination thereof.

15. The article of claim 10, wherein the second composition consists of a butyl rubber.

16. The article of claim 10, wherein the first composition consists of an ethylene/α-olefin/diene interpolymer, an isoprene rubber (synthetic), a butadiene rubber, a styrene butadiene rubber, an ethylene/propylene rubber, an ethylene/diene copolymer, a silicone rubber, or a combination thereof.

17. The article of claim 10, wherein the first composition consists of an ethylene/α-olefin/diene interpolymer, a butadiene rubber, a styrene butadiene rubber, or a combination thereof.

18. The article of claim 10, wherein the first composition consists of an ethylene/α-olefin/diene interpolymer.

* * * * *